(12) United States Patent
Yasuda

(10) Patent No.: US 7,852,398 B2
(45) Date of Patent: *Dec. 14, 2010

(54) IMAGE-TAKING APPARATUS

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/140,427

(22) Filed: Jun. 17, 2008

(65) Prior Publication Data

US 2008/0247741 A1 Oct. 9, 2008

Related U.S. Application Data

(63) Continuation of application No. 10/960,094, filed on Oct. 8, 2004, now Pat. No. 7,403,230.

(30) Foreign Application Priority Data

Oct. 15, 2003 (JP) ............................. 2003-355438

(51) Int. Cl.
*G03B 13/00* (2006.01)
*H04N 5/232* (2006.01)

(52) U.S. Cl. ........................................ 348/345; 396/80

(58) Field of Classification Search ............ 348/207.99, 348/345, 348–356; 396/79–82, 93, 121, 396/125, 139; 250/201.4
See application file for complete search history.

(56) References Cited

U.S. PATENT DOCUMENTS

| 5,815,748 | A | 9/1998 | Hamamura et al. | ......... 396/104 |
| 6,356,307 | B2 | 3/2002 | Ohkawara et al. | ........... 348/360 |
| 7,224,397 | B2 | 5/2007 | Sasaki | ......................... 348/348 |
| 7,403,230 | B2 * | 7/2008 | Yasuda | ........................ 348/353 |
| 2002/0154909 | A1 * | 10/2002 | Yamazaki et al. | ........... 396/125 |
| 2003/0048372 | A1 | 3/2003 | Yasuda | ......................... 348/349 |
| 2003/0081137 | A1 * | 5/2003 | Yamazaki | .................... 348/354 |
| 2003/0150973 | A1 * | 8/2003 | Misawa | .................... 250/201.4 |
| 2004/0095504 | A1 | 5/2004 | Yasuda | ......................... 348/345 |
| 2005/0052563 | A1 | 3/2005 | Yasuda | ......................... 348/345 |

FOREIGN PATENT DOCUMENTS

| JP | 59-146010 | 8/1984 |
| JP | 5-64056 | 3/1993 |
| JP | 06-098234 A | 4/1994 |
| JP | 2001-264622 | 9/2001 |
| JP | 2003-156677 A | 5/2003 |

* cited by examiner

*Primary Examiner*—Jason Whipkey
*Assistant Examiner*—Dennis Hogue
(74) *Attorney, Agent, or Firm*—Fitzpatrick, Cella, Harper & Scinto

(57) ABSTRACT

An image-taking apparatus which achieves focusing in a reduced time with higher accuracy of an in-focus position search in a TV-AF method to minimize occurrence of unnatural focus changes. The apparatus includes an image-taking element, a first detector which outputs a focus evaluation value signal based on a predetermined frequency component of an output signal of the image-pickup element, a second detector which outputs a detection signal different from the focus evaluation value signal, and a controller which performs first processing of obtaining information for an in-focus position search of the focus lens based on the focus evaluation value signal. The controller performs second processing of obtaining information on an in-focus position based on the detection signal from the second detector, and performs third processing different depending on a comparison result between the information from the first processing and the information obtained from the second processing.

2 Claims, 17 Drawing Sheets

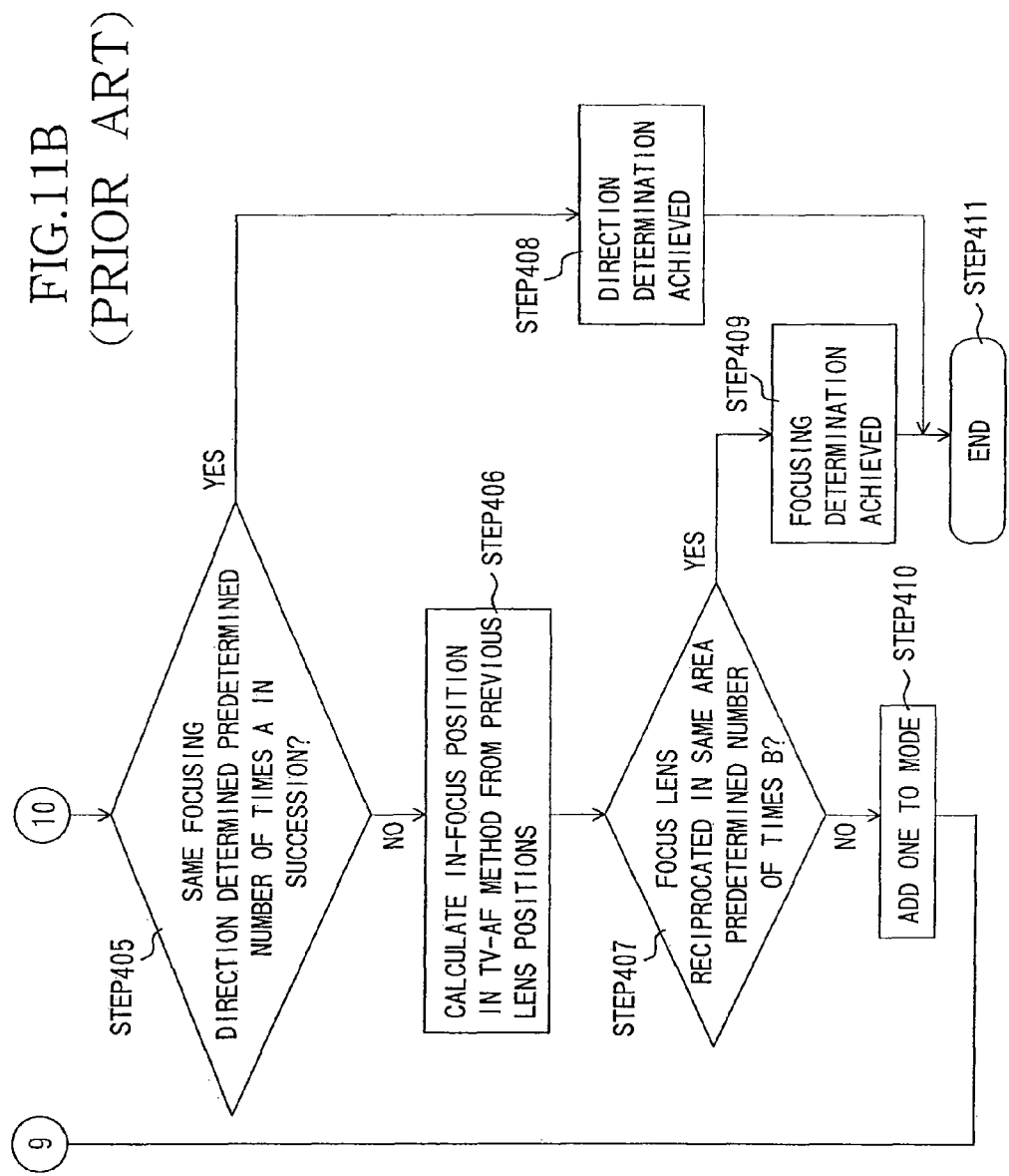

IMAGE-TAKING APPARATUS

This application is a continuation of application Ser. No. 10/960,094, filed Oct. 8, 2004 now U.S. Pat. No. 7,403,230.

BACKGROUND OF THE INVENTION

1. Field of the Invention

The present invention relates to an image-taking apparatus such as a video camera.

2. Description of the Related Art

In recent years, a so-called TV-AF method is mainly used for auto-focus control in video cameras, in which an object image is photoelectrically converted by an image-pickup element into a video signal from which the sharpness of the video is detected and used as an AF evaluation value, and the position of a focus lens at which the AF evaluation value is at the maximum is searched for.

As the AF evaluation value in the TV-AF method, a high-frequency component extracted from a video signal by a band pass filter for a certain band is typically used. When a normal object image is taken, the AF evaluation value is higher as a focus lens approaches an in-focus point (in-focus position) as shown in FIG. 2. The highest level of the AF evaluation value corresponds to the in-focus point.

Another AF method is a TTL (Through The Lens) phase difference detection method. In the TTL phase difference detection method, a luminous flux passing through the exit pupil of an image-taking lens is split into two which are received by a set of line sensors. Then, a displacement amount in signals output according to the received light amounts, that is, a relative positional displacement amount in the direction in which the luminous flux is split, is detected to directly determine a defocus amount of the image-taking lens. Once a focus detection sensor is used to perform storing operation, the drive amount and the drive direction of the focus lens can be provided, so that focus adjustment operation can be performed at high speed.

Another phase difference detection method is an external metering phase difference detection method which does not use light passing through an image-taking lens. In the external metering phase difference detection method, a luminous flux from an object is split into two which are received by a set of line sensors. Then, a displacement amount in signals output according to the received light amounts, that is, a relative positional displacement amount in the direction in which the luminous flux is split, is detected to calculate the distance to the object with triangulation.

Other AF methods using an external metering sensor include a method in which an ultrasonic sensor is used to measure the distance to an object from the propagation speed of ultrasonic waves and a method in which an infrared sensor is used to perform triangulation, and the like.

In addition, a hybrid AF method is used by combining these AF methods. In the hybrid AF method, for example, a focus lens is driven near to an in-focus point in the TTL phase difference detection method, and then the focus lens is driven more accurately to the in-focus position in the TV-AF method (for example, see Japanese Patent Application Laid-Open No. 5-64056 (No. 1993-64056)).

While the TV-AF method generally allows more accurate focusing than the other AF methods, the TV-AF method has the higher focusing accuracy and accordingly tends to require a longer time period to achieve focusing than the other AF methods. Also, when an object is taken with low contrast or in dark conditions, searching for an in-focus position is not necessarily performed accurately in the TV-AF method. If the search for an in-focus position is performed in a wrong direction in which a true in-focus position does not exist, it takes a long time to achieve focusing.

In the aforementioned hybrid AF method, focus adjustment is performed in an AF method other than the TV-AF method with lower accuracy of focusing than the TV-AF method. Thus, when a focus lens is first driven in the AF method other than the TV-AF method, the focus lens may pass an in-focus position at which the lens would stop in the TV-AF method. Thus, a video being taken involves unnatural focus changes in which focusing is once achieved, then slight blurring is caused, and thereafter, focusing is being achieved again by auto-focus in the TV-AF method.

SUMMARY OF THE INVENTION

It is an object of the present invention to provide an image-taking apparatus which achieves higher accuracy of an in-focus position search in the TV-AF method to reduce the time to achieve focusing, thereby minimizing occurrence of unnatural focus changes as mentioned above, a focus control method, and a focus control processing program for the image-taking apparatus.

According to one aspect, the present invention provides an image-taking apparatus comprising an image-pickup element which photoelectrically converts an object image formed by an image-taking optical system including a focus lens, a first detector which outputs a focus evaluation value signal representing a focusing state of the image-taking optical system based on a predetermined frequency component of an output signal of the image-pickup element, a second detector which outputs a detection signal different from the focus evaluation value signal, and a controller which performs first processing of obtaining information for searching for an in-focus position of the focus lens based on the focus evaluation value signal. The controller performs second processing of obtaining information on an in-focus position of the focus lens based on the detection signal from the second detector, and the controller performs third processing different depending on a comparison result between the information obtained by the first processing and the information obtained by the second processing.

According to another aspect, the present invention provides a focus control method and a focus control processing program each comprising, step of producing a focus evaluation value signal representing a focusing state of an image-taking optical system based on a predetermined frequency component of an output signal of an image-pickup element, a step of inputting a detection signal different from the focus evaluation value signal, first processing step of obtaining information for searching for an in-focus position of the focus lens based on the focus evaluation value signal, second processing step of obtaining information on an in-focus position of the focus lens based on the detection signal, and a control step of performing third processing different depending on a comparison result between the information obtained by the first processing step and the information obtained by the second processing step.

The "information on an in-focus position" includes not only information representing an in-focus position but also information representing a direction of an in-focus position and information representing a drive amount of the focus lens to reach an in-focus position.

The "second detector" may be any device which outputs a detection signal for detecting the distance to an object or which outputs a detection signal for detecting a defocus amount of the image-taking optical system based on an output signal from the image-pickup element.

These and other characteristics of the image-taking apparatus, the focus control method, and the processing program will be apparent from the following description of specific embodiments with reference to the drawings.

BRIEF DESCRIPTION OF THE DRAWINGS

FIG. 11B is a flow chart showing the fine drive control of the AF control in the related art.

DETAILED DESCRIPTION OF THE PREFERRED EMBODIMENTS

Figure 1:
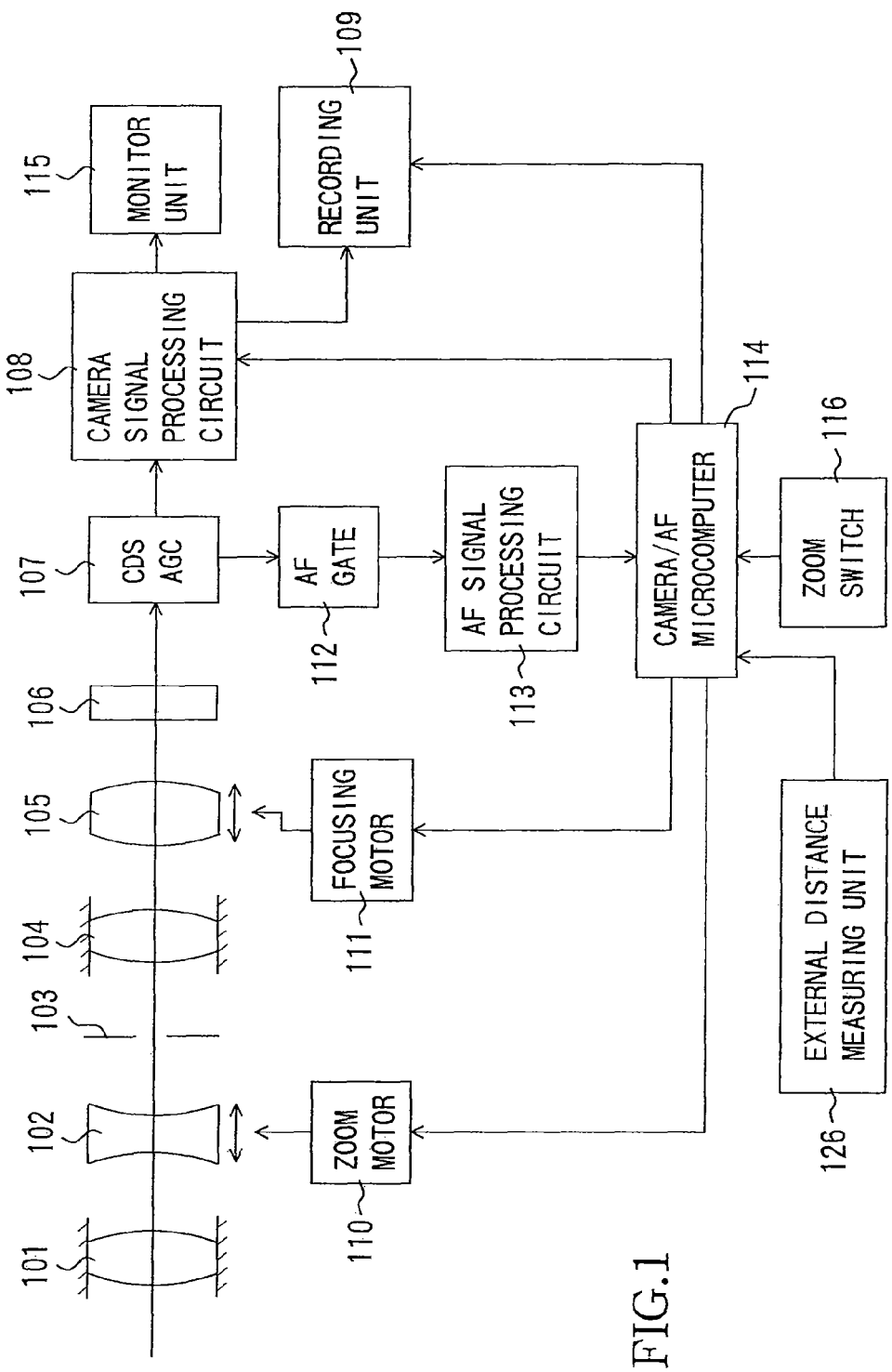
FIG. 1 is a block diagram showing the structure of a video camera which is Embodiment 1 of the present invention.
Figure 2:
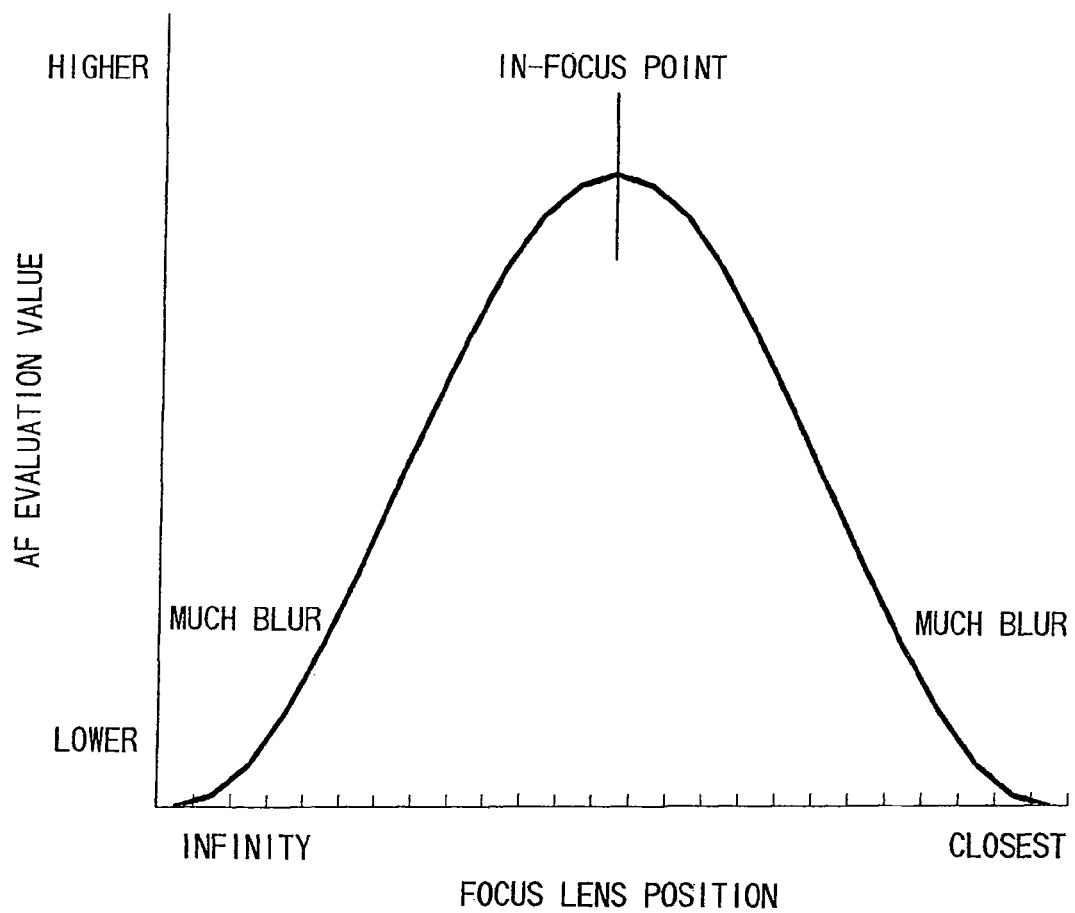
FIG. 2 is a graph showing the relationship between an AF evaluation value and the position of a focus lens unit.

Prior to description of preferred embodiments, the correspondence between the embodiments and the present invention is described.

First, "different types of processing (third processing)" in the present invention performed by a controller (or in a control step), later described, include the following specific examples.

As an example 1, when the controller performs first control of driving a focus lens for performing first processing and a second control of driving the focus lens for an in-focus position search according to information obtained by the first processing, the controller performs processing of determining transition from the first control to the second control under different conditions. Alternatively, the controller performs processing of allowing the transition from the first control to the second control and processing of inhibiting the transition.

As an example 2, the controller performs processing of vibrationally driving the focus lens with different amplitudes.

As an example 3, the controller performs processing of driving the focus lens for an in-focus position search at different drive speeds.

As an example 4, the controller performs processing of determining the reversal of the drive direction of the focus lens for an in-focus position search under different conditions. Alternatively, the controller performs processing of allowing the reversal of the drive direction of the focus lens for the in-focus position search and processing of inhibiting the reversal.

As an example 5, the controller performs processing of determining that the focus lens is located at an in-focus position under different conditions. Alternatively, the controller performs processing of allowing the determination that the focus lens is located at the in-focus position and processing of inhibiting the determination.

According to the embodiments, different types of processing (third processing) are performed depending on the comparison result between information obtained by the first processing (that is, information about an in-focus position and its direction obtained on the basis of a focus evaluation value signal in the TV-AF method) and information obtained by the second processing (that is, information about an in-focus position and its direction obtained on the basis of an object distance provided from external metering and a defocus amount obtained in the phase difference detection method). It is thus possible to improve accuracy (avoid erroneous operation) in searching for an in-focus position in the TV-AF method and to reduce the time to achieve focusing in the TV-AF method.

According to the example 1, it is possible to reduce the execution of the second control based on the wrong information obtained in the first processing.

According to the examples 2 and 3, the focus lens can be moved quickly to the in-focus position.

According to the example 4, it is possible to reduce the erroneous reversal control of the drive direction of the focus lens.

According to the example 5, it is possible to reduce the stop of focusing control based on a wrong determination that the focus lens is located at the in-focus position.

In the following, the embodiments of the present invention are described in conjunction with the technology as the premise of the present invention and with reference to the drawings.

Embodiment 1

FIG. 1 shows the structure of a video camera (an image-taking apparatus) which is Embodiment 1 of the present invention. While description is made for a video camera integral with an image-taking lens, the present invention is applicable to a video camera on which an image-taking lens is mountable. In this case, a control signal produced by a camera/AF microcomputer, later described, is communicated to a microcomputer in the image-taking lens such that the camera/AF microcomputer controls the drive of a focus lens unit via the lens microcomputer. In addition, while the video camera is described in Embodiment 1, the present invention is applicable to various types of image-taking apparatuses such as a digital still camera. This applies to Embodiment 2, later described.

In FIG. 1, reference numeral 101 denotes a first fixed lens unit, reference numeral 102 denotes a lens unit (hereinafter referred to as a zoom lens unit) which provides variable magnification, reference numeral 103 denotes a stop, reference numeral 104 denotes a second fixed lens unit, and reference numeral 105 denotes a lens unit (hereinafter referred to as a focus lens unit) which has both of a focus adjusting function and a so-called compensator function of correcting movements of an image surface due to varied magnification. An image-taking optical system constituted by these lens units is a rear focus optical system formed of the four lens units having a positive, a negative, a positive, a positive optical powers in order from an object side (the left side in FIG. 1). It should be noted that, while each lens unit is shown in FIG. 1 as it is formed of a single lens, each lens unit may actually be formed of a single lens or a plurality of lenses. In addition, the present invention is applicable to an image-taking apparatus which has an image-taking optical system of a different optical structure.

The zoom lens 102 and the focus lens 105 are driven by a zoom motor 110 and a focusing motor 111, respectively, in an optical axis direction (the left-to-right direction in FIG. 1).

Incident light from an object passes through the lens units and the stop 101 to 105 to form an image on an image-pickup element 106. The image-pickup element 106 is a photoelectrical conversion element such as a CCD and a CMOS sensor which converts the object image formed on an image-pickup surface into an electric signal. The electric signal output from the image-pickup element 106 is sampled by a CDS/AGC circuit 107 for gain adjustment and then input to a camera signal processing circuit 108.

The camera signal processing circuit 108 performs predetermined processing on the signal input from the CDS/AGC circuit 107 to produce a video signal appropriate for record and display in a recording unit 109 and on a monitor unit 115, respectively. The recording unit 109 records the video signal input thereto on a recording medium (such as a magnetic tape, an optical disc, and a semiconductor memory). The monitor unit 115 displays the video of the object on a display (not shown) such as an electronic viewfinder and a liquid crystal panel based on the video signal input thereto.

On the other hand, the video signal output from the CDS/AGC circuit 107 is also input to an AF gate 112. The AF gate 112 selects a signal component associated with the area of a display screen for use in focus control out of the video signal corresponding to the whole screen, and outputs the selected signal component to an AF signal processing circuit (a first detector) 113. The area of the screen for use in focus control can be set arbitrarily, and a plurality of areas may be set.

The AF signal processing circuit 113 extracts an AF evaluation value signal (a focus evaluation value signal) such as a high-frequency component for use in focus control with the TV-AF method and a luminance difference component produced from the high-frequency signal component (a difference between the maximum and minimum in luminance level of the video signal) out of the input video signal, and outputs the extracted signal to a camera/AF microcomputer 114. The AF evaluation value signal represents the sharpness of the video based on the output signal from the image-pickup element 106. Since the sharpness changes with the focusing state of the image-taking optical system, the AF evaluation value signal consequently represents the focusing state of the image-taking optical system.

The camera/AF microcomputer 114 outputs a control signal to the focusing motor 111 to drive the focus lens unit 105 in small amounts in order to search for the position (an in-focus position) of the focus lens unit 105 at which the AF evaluation value is at the maximum level (at the maximum value or a value close thereto). This control is the so-called "TV-AF method."

The camera/AF microcomputer 114 is responsible for control of the entire video camera. The output from the aforementioned AF signal processing circuit 113 and an output from an external distance measuring unit (a second detector) 126, later described, are input to the camera/AF microcomputer 114 and used in calculations for AF control. The camera/AF microcomputer 114 outputs the control signal to the aforementioned focusing motor 111 according to the calculation result to drive the focus lens unit 105.

The external distance measuring unit 126 is a sensor of an external metering type, specifically, a type in which the distance to an object is measured without using light passing through the image-taking optical system (the image-taking lens) and then a signal based on the distance is output. A distance sensor of a passive type can be used as the external distance measuring unit 126. In distance measurement of the passive type, a luminous flux from an object is split into two which are received by a set of line sensors to detect a displacement amount in signals output according to the received light amounts, that is, a relative positional displacement amount in the direction in which the luminous flux is split, to determine the distance to the object with triangulation.

In addition to the distance measurement method of the passive type, distance measurement of an active type includes a method in which an ultrasonic sensor is used to determine the distance to an object from the measured propagation speed of ultrasonic waves, and a triangulation method often used in a compact camera in which infrared rays applied to an object are used. As the second detecting means in the present invention, a sensor or a circuit suitable for any of these distance measuring methods and other distance measuring methods can be used.

The camera/AF microcomputer 114 calculates a position of the focus lens unit 105 (an in-focus position) for achieving focusing or a direction from the current position toward the in-focus position based on the information about the distance to the object detected or measured with the detection signal from the external distance measuring unit 126 and information about the focal length of the image-taking optical system (which can be obtained from an output from a position sensor, not shown, for detecting the position of the zoom lens unit 102 or a drive pulse count of the zoom motor 110 from a reference position), or reads the in-focus position or the direction from table data. The detection method is herein referred to as an external distance measuring detection method.

A zoom switch 116 is operated by a user to output an operation signal according to the operation direction and the operation amount. The camera/AF microcomputer 114 drives the zoom motor 110 (the zoom lens unit 102) in response to the operation signal to perform variable magnification. At this point, the camera/AF microcomputer 114 drives the focusing motor 111 (the focus lens unit 105) according to zoom tracking data stored in a memory, not shown, to correct movements of an image surface due to the varied magnification.

Figure 3:
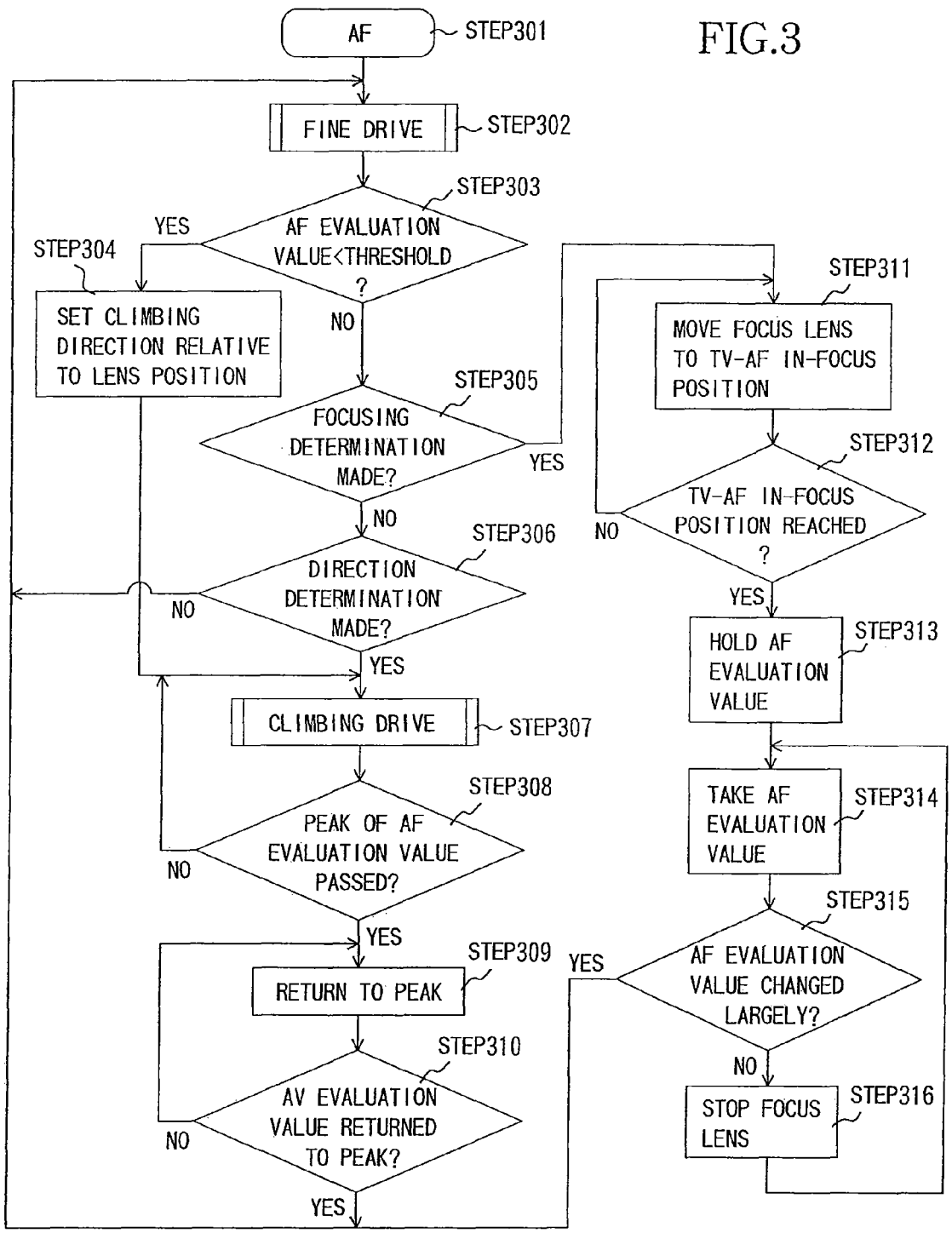
FIG. 3 is a flow chart showing the outline of AF control in the video camera of Embodiment 1.

Next, detailed description is made for AF control performed by the camera/AF microcomputer 114 with reference to FIGS. 2 to 7. The general AF operation is first described with reference to FIG. 3. The whole AF control described in FIG. 3 is similar to the premise technology of the present invention.

When the power of the video camera is turned on or an AF switch is turned on, the camera/AF microcomputer 114 starts processing at step 301.

Then, at step 302, the camera/AF microcomputer 114 performs fine drive of the focus lens unit 105 to determine whether or not focusing is achieved, and if not, it is determined in which direction of drive an in-focus point (an in-focus position) lies. The fine drive is later described with reference to FIGS. 4A to 4C.

Next, at step 303, the camera/AF microcomputer 114 reads a signal (a focus evaluation signal) representing an AF evaluation value from the AF signal processing circuit 113 and determines whether or not the AF evaluation value is lower than a predetermined threshold. If it is lower, the flow proceeds to step 304, or to step 305 if it is higher.

At step 304, the camera/AF microcomputer 114 immediately proceeds to climbing drive since it is difficult to determine the direction in which the focus lens unit 105 should be driven for focusing when the AF evaluation value is low, and the determination of the direction takes a long time to result in poor responsibility. Thus, at step 304, the camera/AF microcomputer 114 sets a direction in which the in-focus position is likely to lie as a climbing direction relative to the current position of the focus lens unit 105 (which can be obtained from an output from a position sensor, not shown, for detecting the position of the focus lens unit 105 or a drive pulse count of the focusing motor 111 from a reference position). Specifically, the climbing direction is toward the closest side when the current position of the focus lens unit 105 lies on the infinity side relative to the in-focus position, while the climbing direction is toward the infinity when the current position of the focus lens unit 105 lies on the closest side relative to the in-focus position.

The threshold in this case may be determined with reference to the AF evaluation value when an object image is blurred unrecognizably in video signals. Then, the flow proceeds to step 307.

At step 305, it is determined whether or not an in-focus state can be determined with the fine drive at step 302. If the in-focus state can be determined (if a focusing determination flag, later described, is set to one), the flow proceeds to step 311 where focusing/restart determination processing is performed. If the in-focus state cannot be determined (if the focusing determination flag, later described, is set to zero), the flow proceeds to step 306.

At step 306, it is determined whether or not the direction can be determined with the fine drive at step 302. If the direction can be determined (if a direction determination flag, later described, is set to one), the flow proceeds to step 307 where the climbing drive is performed. If the direction cannot be determined (if the direction determination flag, later described, is set to zero), the flow returns to step 302 to continue the fine drive.

At step 307, the camera/AF microcomputer 114 performs the climbing drive of the focus lens unit 105. The climbing drive is later described with reference to FIG. 6.

At step 308, the camera/AF microcomputer 114 determines whether or not the AF evaluation value passes the peak (the maximum value: the value at the in-focus point in FIG. 2) in the climbing drive. If it is determined that the peak is passed, the flow proceeds to step 309. If it is determined that the peak is not passed, the flow returns to step 307 to continue the climbing drive.

At step 309, the camera/AF microcomputer 114 outputs a control signal to the focusing motor 111 such that the focus lens unit 105 is returned to the position (the in-focus point) at which the AF evaluation value during the climbing drive is at the peak.

At step 310, it is determined whether or not the focus lens unit 105 returns to the position (or close to the position) where the AF evaluation value is at the peak. If the focus lens unit 105 returns to the position corresponding to the peak, the flow returns to step 302 where the fine drive is again performed. If the focus lens unit 105 does not return to the position corresponding to the peak, the flow returns to step 309 to continue the operation for returning the focus lens unit 105 to the peak.

On the other hand, when the in-focus state can be determined at step 305, the focusing/restart determination processing is performed from step 311 to step 316.

At step 311, the focus lens unit 105 is moved to the in-focus position at which the in-focus state is determined.

At step 312, it is determined whether or not the focus lens unit 105 reaches the in-focus position. If it reaches the in-focus position, the flow proceeds to step 313. If it does not reach the in-focus position, the flow returns to step 311.

At step 313, the AF evaluation value when it is determined that the focus lens unit 105 reaches the in-focus position (the in-focus point) at step 312 is stored in a memory, not shown.

Next, at step 314, the (latest) AF evaluation value at this point is taken from the AF signal processing circuit 113. At step 315, the AF evaluation value held at step 313 is compared with the latest AF evaluation value to determine whether the variation in the AF evaluation value is larger than a predetermined value. If the variation in the AF evaluation value is larger than the predetermined value, the flow proceeds to step 302 to start the fine drive operation again. If the variation in the AF evaluation value is smaller than the predetermined value, the flow proceeds to step 316.

At step 316, the focus lens unit 105 is stopped, and the flow returns to step 314 to continue the focusing/restart determination processing.

(Premise Technology)

Figure 11A:
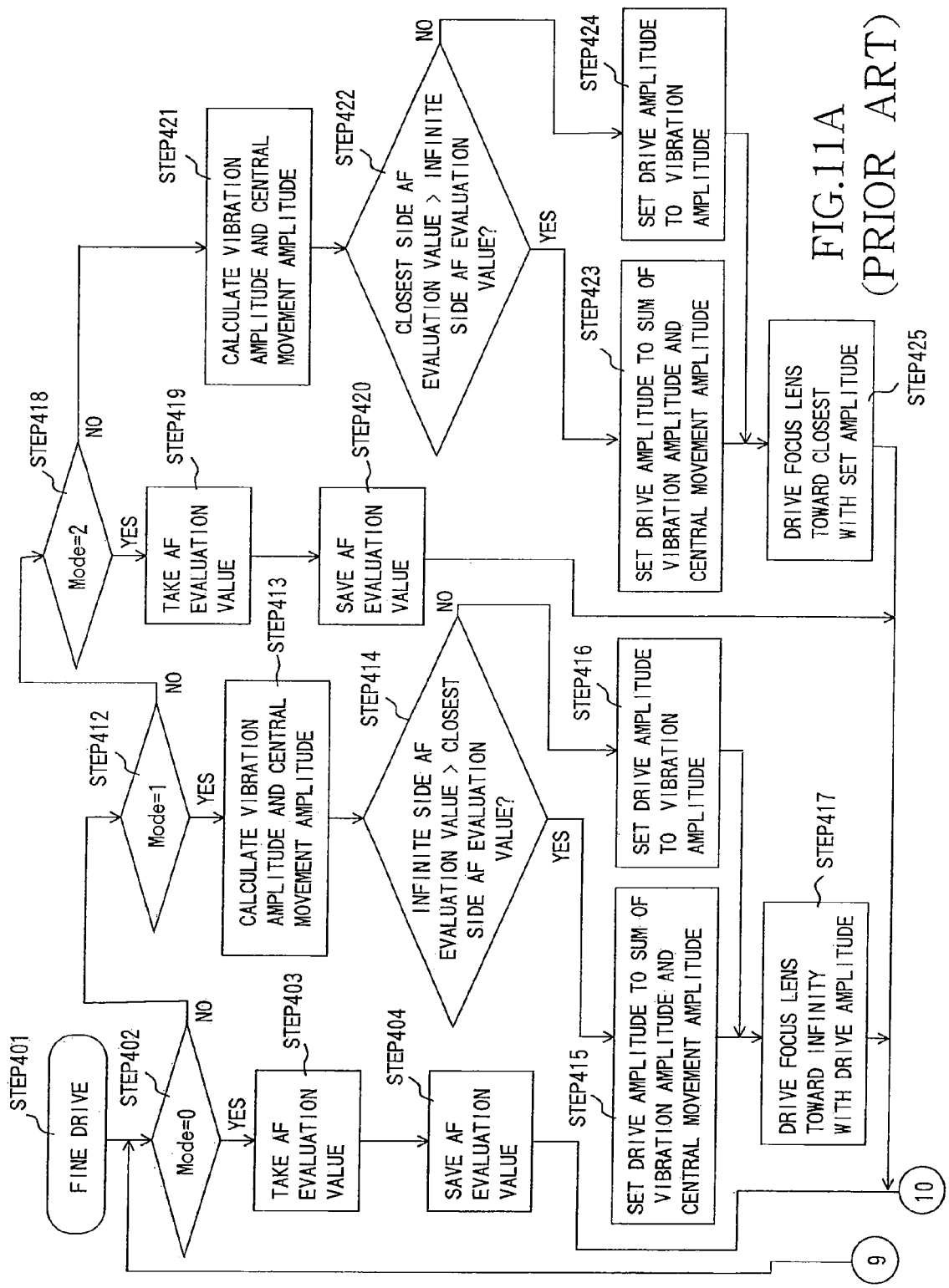
FIG. 11A is a flow chart showing fine drive control of AF control in the related art.

To facilitate the understanding of the fine drive control (first control, first control step) and the climbing drive control (second control, second control step) in Embodiment 1, later described, description is first made for fine drive control and climbing drive control in the related art, which are the premise technology of the present invention, with reference to FIGS. 11A and 11B.

At step 401, the camera/AF microcomputer starts the processing. Next, at step 402, the camera/AF microcomputer 114 determines whether or not the current mode is Mode zero. If it is Mode zero, the flow proceeds to step 403 to perform processing when it is determined that the focus lens unit 105 lies on the closest side in the fine drive, as later described. On the other hand, when it is determined that the focus lens unit 105 is driven toward the infinite side, the flow proceeds to step 412.

(Processing when the Focus Lens Unit 105 Lies on the Closest Side)

At step 403, the camera/AF microcomputer 114 takes the AF evaluation value from the AF signal processing circuit 113. The AF evaluation value is based on a video signal formed from electric charge accumulated in the image-pickup element 106 when the focus lens unit 105 is located on the infinite side in Mode 2, later described.

Next, at step 404, the AF evaluation value taken at step 403 is saved as an infinite side AF evaluation value in a memory, not shown.

At step 405, it is determined whether or not the same direction is determined as the direction of an in-focus position (the in-focus direction) a predetermined number of times a in succession. If so, the flow proceeds to step 408, or to step 406 if not.

At step 406, the average of the focus lens positions in a predetermined time period after the fine drive control is started is calculated, and the result is saved in a memory, not shown, as an in-focus position with the TV-AF.

At step 407, it is determined whether or not the focus lens unit 105 repeats the reciprocation in the same area (that is, near the in-focus position) a predetermined number of times b. If so, the flow proceeds to step 409, or if not, the flow proceeds to step 410 where one is added to the value of Mode (Mode returns to zero when the addition results in four or more) before the flow proceeds to step 402.

At step 408, the direction can be determined (the direction determination flag is set to one), so that the flow proceeds to step 411 where the processing is ended to proceed to the climbing drive.

At step 409, the in-focus state can be determined (the focusing determination flag is set to one), so that the flow proceeds to step 411 where the processing is ended to proceed to the restart determination.

At step 412, it is determined whether or not the current mode is Mode one. If it is Mode one, the flow proceeds to step 413 to perform processing for driving the focus lens unit 105 toward the infinite side, later described. If it is not Mode one, the flow proceeds to step 418.

(Processing of Driving the Focus Lens Unit 105 Toward the Infinite Side)

At step 413, the camera/AF microcomputer 114 calculates a vibration amplitude and a central movement amplitude in the fine drive. Although not described herein in detail, the amplitude is set typically with reference to the depth of focus such that a small amplitude is set when the depth of focus is small, while a large amplitude is set when the depth of focus is large.

At step 414, the infinite side AF evaluation value in Mode 0 described above is compared with a closest side AF evaluation value in Mode 3 later described. If the infinite side AF evaluation value is larger than the closest side AF evaluation value, the flow proceeds to step 415. If the infinite side AF evaluation value is equal to or smaller than the closest side AF evaluation value, the flow proceeds to step 416.

At step 415, the drive amplitude is set to the sum of the vibration amplitude and the central movement amplitude.

At step 416, the drive amplitude is set to the vibration amplitude.

At step 417, the camera/AF microcomputer 114 outputs a control signal to the focusing motor 111 such that the focus lens unit 105 is driven toward the infinite with the amplitude determined at step 415 or step 416. Then, the flow proceeds to the processing at step 405 and afterward as described above.

At step 418, it is determined whether or not the current mode is Mode 2. If it is Mode 2, the flow proceeds to step 419 to perform processing when it is determined that the focus lens unit 105 lies on the infinite side in the fine drive, later described. On the other hand, if it is determined that the focus lens unit 105 is driven toward the closest side, the flow proceeds to step 421.

(Processing when the Focus Lens Unit 105 Lies on the Infinite Side)

At step 419, the camera/AF microcomputer 114 takes the AF evaluation value from the AF signal processing circuit 113. The AF evaluation value is based on a video signal formed from electric charge accumulated in the image-pickup element 106 when the focus lens unit 105 lies on the closest side in Mode zero as described above.

At step 420, the AF evaluation value taken at step 419 is saved as a closest side AF evaluation value in a memory, not shown. Then, the flow proceeds to the processing at step 405 and afterward described above.

(Processing of Driving the Focus Lens Unit 105 Toward the Closest Side)

At step 421, the camera/AF microcomputer 114 calculates a vibration amplitude and a central movement amplitude in the fine drive of the focus lens unit 105. Although not described herein in detail, the amplitude is set typically with reference to the depth of focus such that a small amplitude is set when the depth of focus is small, while a large amplitude is set when the depth of focus is large.

At step 422, the infinite side AF evaluation value in Mode 0 described above is compared with the closest side AF evaluation value in Mode 3 described above. If the closest side AF evaluation value is larger than the infinite side AF evaluation value, the flow proceeds to step 423. If the closest side AF evaluation value is equal to or smaller than the infinite side AF evaluation value, the flow proceeds to step 424.

At step 423, the drive amplitude is set to the sum of the vibration amplitude and the central movement amplitude.

At step 424, the drive amplitude is set to the vibration amplitude.

At step 425, the camera/AF microcomputer 114 outputs a control signal to the focusing motor 111 such that the focus lens unit 105 is driven toward the closest side with the amplitude determined at step 423 or step 424. Then, the flow proceeds to the processing at step 405 and afterward as described above.

Figure 5:
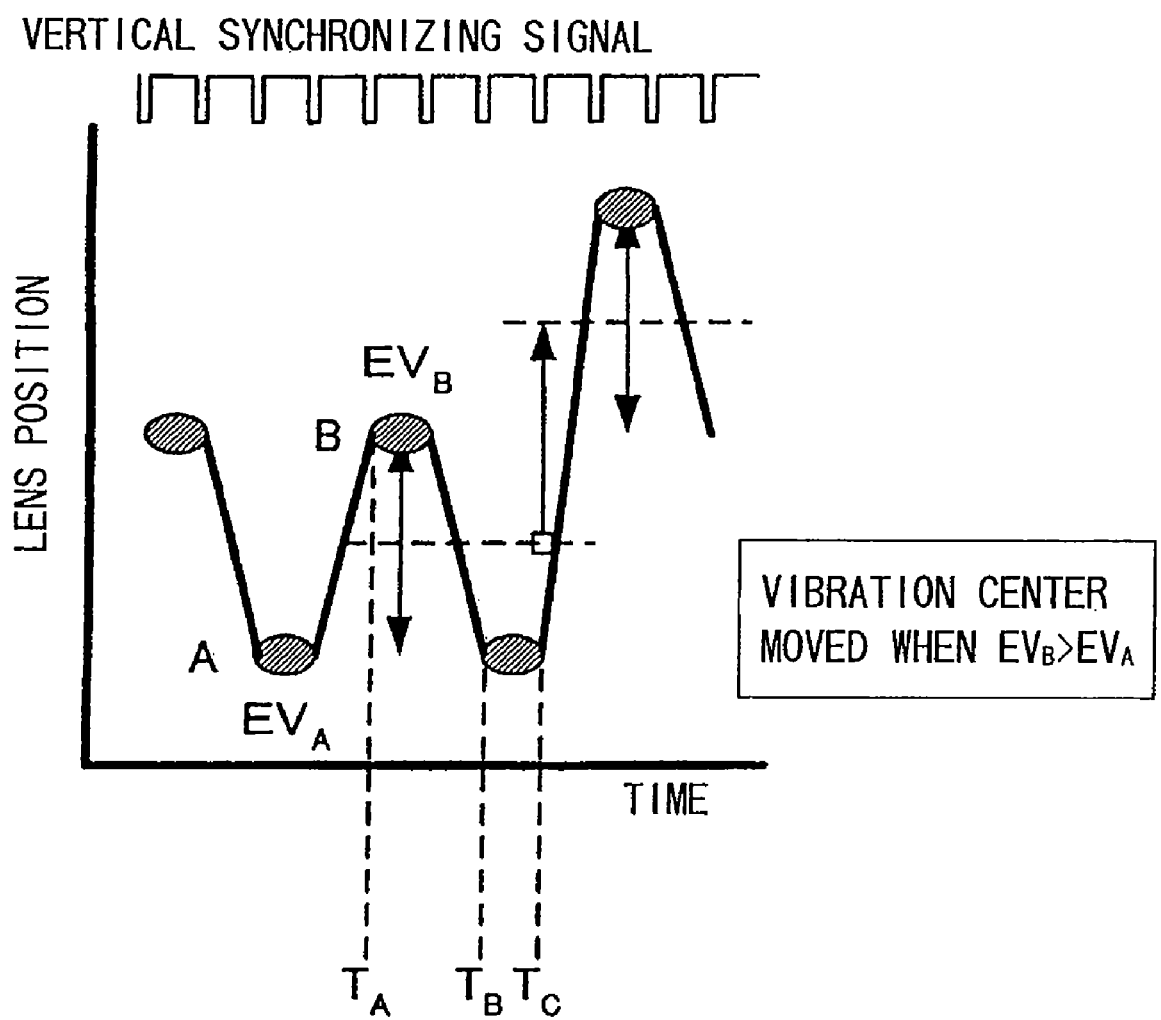
FIG. 5 is a diagram schematically showing the fine drive control of the focus lens unit in the AF control.

FIG. 5 shows the aforementioned focus lens operation over time. The horizontal axis represents time, while the vertical axis represents the position of the focus lens unit 105. In a pulse waveform shown in an upper portion of FIG. 5, downward edges represent a vertical synchronizing signal for video signals.

In FIG. 5, an AF evaluation value $EV_A$ for electric charge (shown by a shaded ellipse) accumulated in the image-pickup element 106 during a period A is taken at a time $T_A$, while an AF evaluation value $EV_B$ for electric charge (shown by a shaded ellipse) accumulated in the image-pickup element 106 for a period B is taken at a time $T_B$. At a time $T_C$, the AF evaluation values $EV_A$ and $EV_B$ are compared. If $EV_B$ is larger than $EV_A$, the vibration center is moved (the drive amplitude is set to the sum of the vibration amplitude and the central movement amplitude). On the other hand, if the $EV_A$ is larger than $EV_B$, the vibration center is not moved (the drive amplitude is set to the vibration amplitude).

Figure 12:
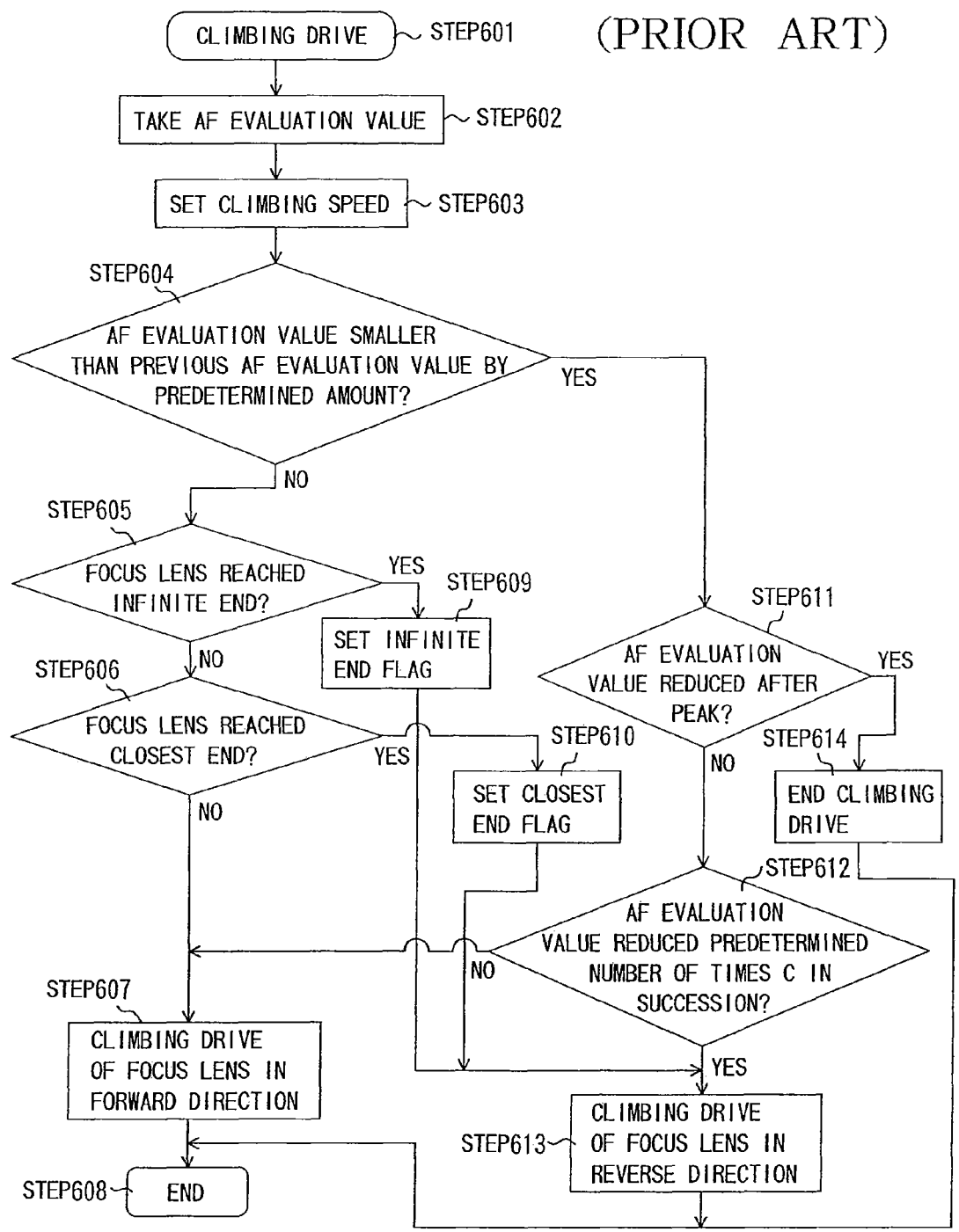
FIG. 12 is a flow chart showing climbing drive control of the AF control in the related art.

Next, the climbing drive control of the focus lens unit 105 in the related art is described with reference to FIG. 12. At step 601, the camera/AF microcomputer 114 starts the processing.

At step 602, the camera/AF microcomputer 114 takes the AF evaluation value from the AF signal processing circuit 113.

Next, at step 603, the camera/AF microcomputer 114 sets the drive speed of the focus lens unit 105 in the climbing drive control to a predetermined value. Although not described herein in detail, the predetermined value is set typically with reference to the depth of focus such that a low speed is set when the depth of focus is small, while a high speed is set when the depth of focus is large.

At step 604, it is determined whether or not the AF evaluation value taken at step 602 is smaller than the previous AF evaluation value by a predetermined amount. If not, the flow proceeds to step 605, or to step 611 if it is smaller. The predetermined amount corresponds to a value which is determined in consideration of the S/N ratio of the AF evaluation value and is equal to or larger than a variation in the AF evaluation value when an object is fixed and the focus lens unit 105 is positioned fixedly. Otherwise, the climbing drive cannot be performed in a correct direction due to the influence of the variation in the AF evaluation value.

At step 605, it is determined whether or not the focus lens unit 105 reaches the infinite end. The infinite end refers to the position nearest to the infinite in the stroke of the focus lens unit 105 defined in design. If it reaches the infinite end, the flow proceeds to step 609. If not, the flow proceeds to step 606.

At step 606, it is determined whether or not the focus lens unit 105 reaches the closest end. The closest end refers to the position nearest to the closest point in the stroke of the focus lens unit 105 defined in design. If it reaches the closest end, the flow proceeds to step 610. If not, the flow proceeds to step 607.

At step 609, the flag indicating the infinite end is set. At step 610, the flag indicating the closest end is set. The flow proceeds to step 613 from both of steps 609 and 610. At step 613, the camera/AF microcomputer 114 outputs a control signal to the focusing motor 111 such that the focus lens unit 105 continues the climbing drive in the direction opposite to the end shown by the aforementioned flag.

At step 607, the camera/AF microcomputer 114 outputs a control signal to the focusing motor 111 such that the climbing drive of the focus lens unit 105 is performed at a predetermined speed in the same direction (the forward direction) as in the previous drive. Then, the flow proceeds to step 608 to end the current processing.

At step 611, it is determined whether or not the AF evaluation value is reduced passing through the peak. If it is not determined that the AF evaluation value is reduced passing through the peak, the flow proceeds to step 612. If the AF evaluation value is reduced passing through the peak, the flow proceeds to step 614 where the processing is ended to proceed to the fine drive via step 608.

At step 612, it is determined whether or not the AF evaluation value is reduced a predetermined number of times c in succession. If so, the flow proceeds to step 613, or to step 607 if not.

At step 613, the camera/AF microcomputer 114 outputs a control signal to the focusing motor 111 such that the climbing drive of the focus lens unit 105 is performed at a predetermined constant speed in the direction opposite to the direction in the previous drive. Then, the flow proceeds to step 608 to end the current processing.

Figure 7:
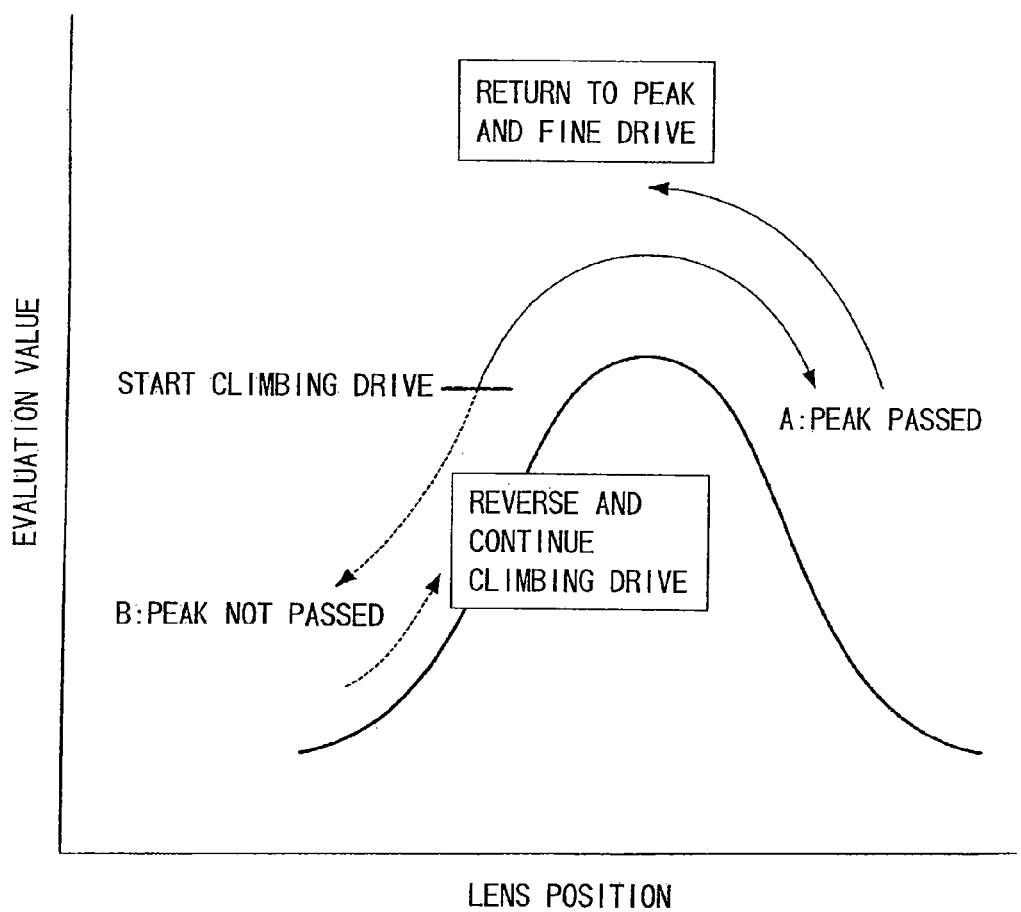
FIG. 7 is a graph schematically showing the climbing drive control.

FIG. 7 shows the movement of the focus lens unit 105 in the climbing drive described above. The vertical axis represents the AF evaluation value, while the horizontal axis represents the position of the focus lens unit 105. An arrow A shows the case where the AF evaluation value is reduced passing through the peak, in which case it is determined that the in-focus point is passed, so that the climbing drive is ended to proceed to processing of the fine drive. On the other hand, in the case indicated by an arrow B, the AF evaluation value does not pass the peak and is reduced, so that it is determined that the direction is wrong and the drive direction is reversed, and the climbing drive is continued.

As described above, the camera/AF microcomputer 114 controls the drive of the focus lens unit 105 such that the AF evaluation value keeps the maximum through repeated cycles of determination of restart, fine drive, climbing drive, fine drive, and determination of restart, thereby maintaining the in-focus state.

(Fine Drive Control and Climbing Drive Control in Embodiment 1)

The fine drive control and the climbing drive control in Embodiment 1 are described below. The following description is made mainly for the differences from the fine drive control and the climbing drive control described as the premise technology.

Figure 4A:
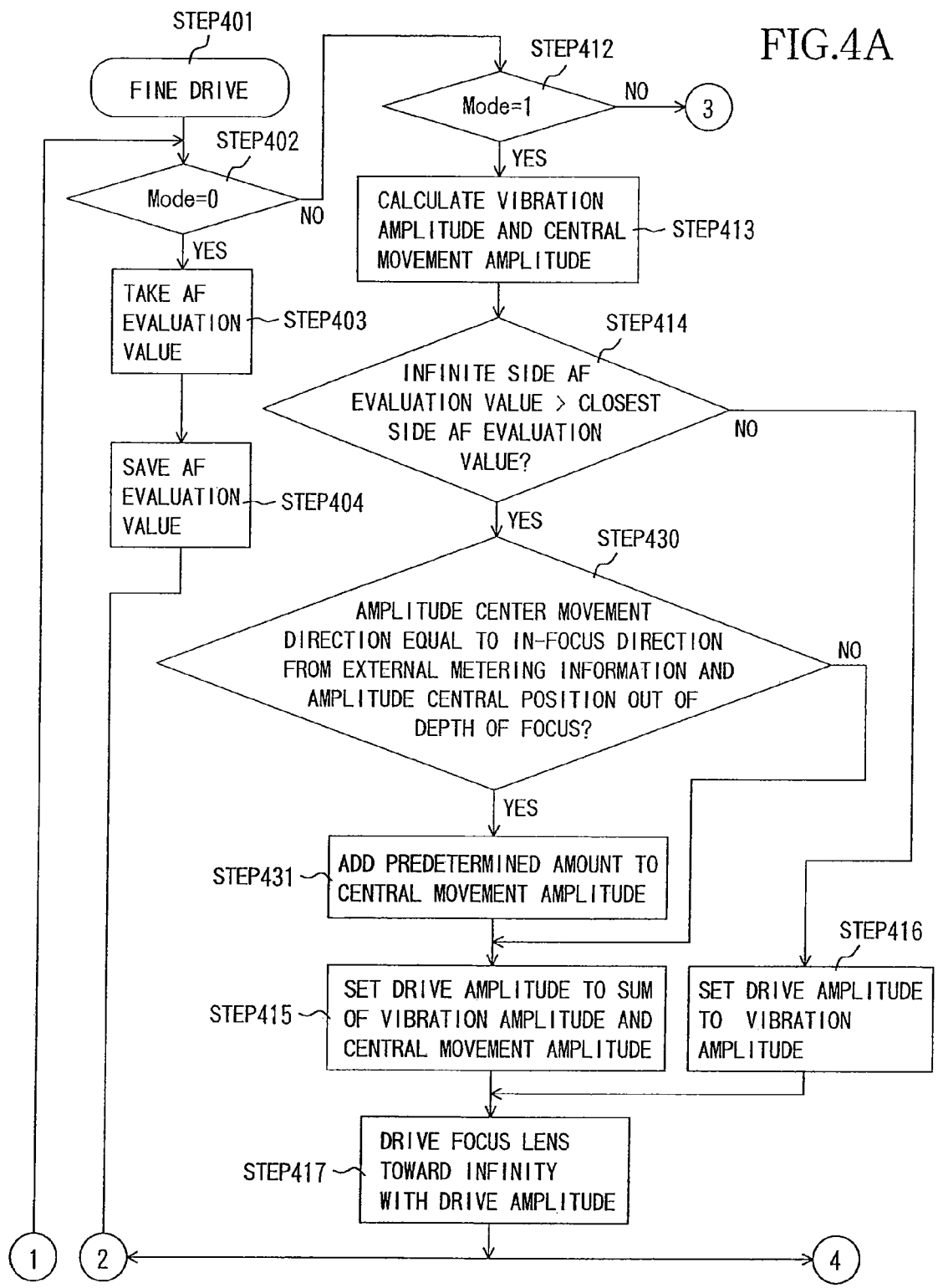
FIG. 4A is a flow chart showing fine drive control of the focus lens unit in the AF control.
Figure 4B:
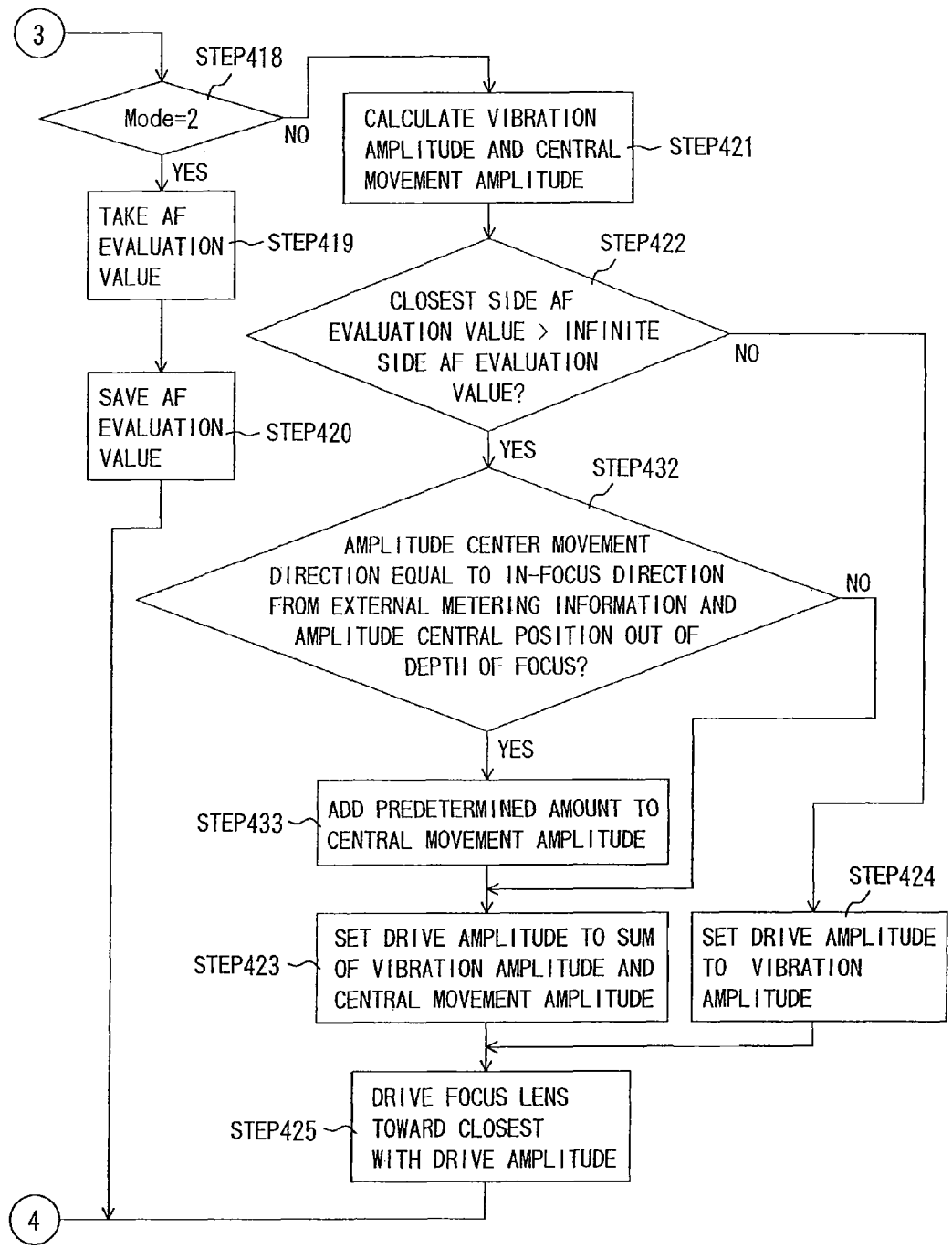
FIG. 4B is a flow chart showing the fine drive control of the focus lens unit in the AF control.
Figure 4C:
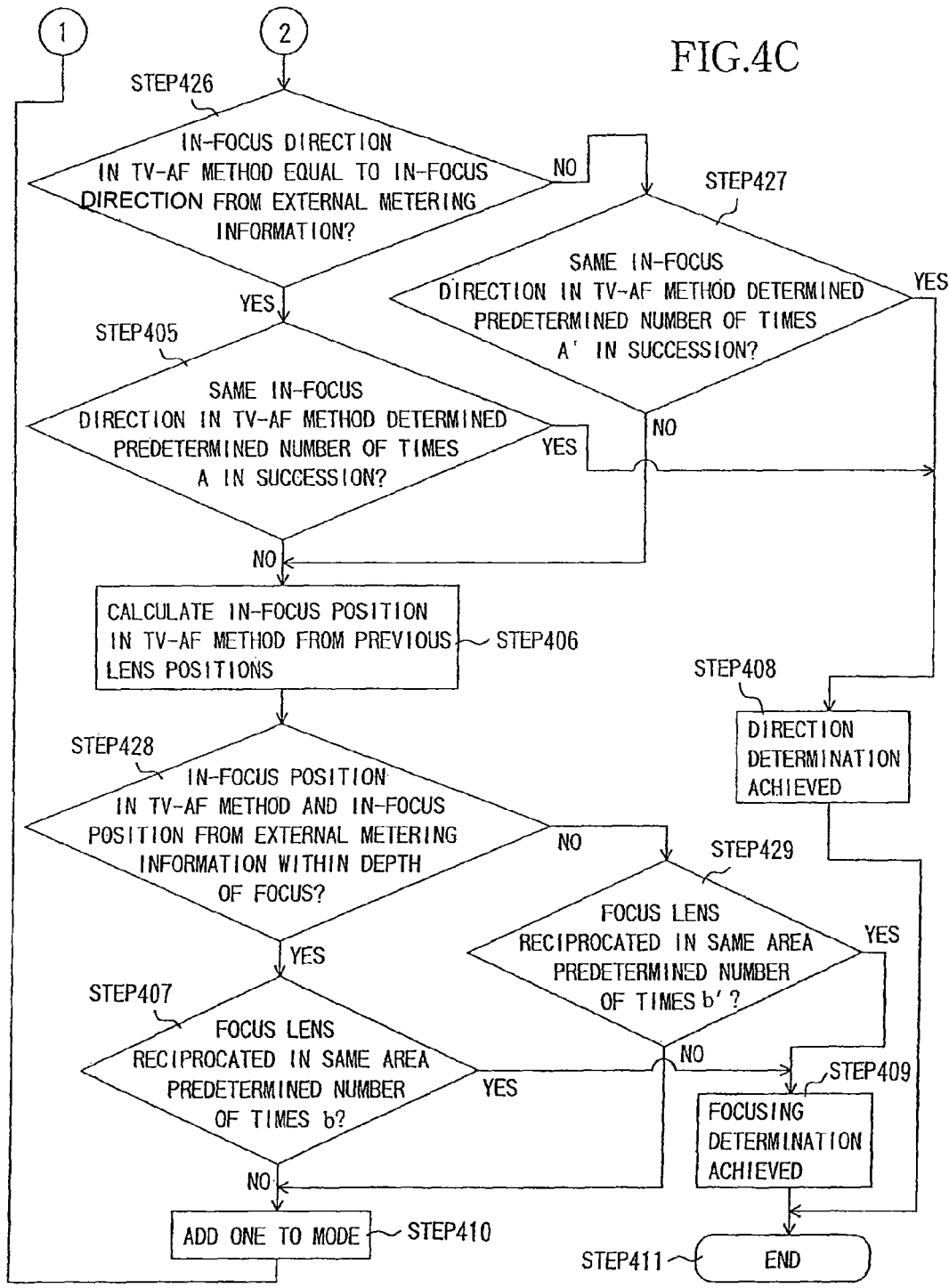
FIG. 4C is a flow chart showing the fine drive control of the focus lens unit in the AF control.

The fine drive control in Embodiment 1 is first described with reference to FIGS. 4A to 4C. The steps identical to those described in the fine drive control of the related art described in FIGS. 11A and 11B are designated with the same reference numerals in FIGS. 4A to 4C and description thereof is omitted. In FIGS. 4A to 4C, the same circled characters indicate links therebetween.

At step 404, an AF evaluation value is taken in a memory, not shown. Then, at step 426, the camera/AF microcomputer 114 compares the direction (hereinafter referred to as an amplitude center movement direction: first direction information) of an in-focus position detected in the TV-AF method (an amplitude central position in vibration drive) relative to the current position with the direction (hereinafter referred to as an external metering in-focus direction: second direction information) of an in-focus position detected on the basis of a detection signal from the external measuring distance unit 126 relative to the current position to determine whether or not they are the same direction. If they are the same direction, the flow proceeds to step 405, or to step 427 if they are different.

It is determined at step 405 whether or not the same direction is determined as the in-focus direction a predetermined number of times a in succession. At step 427, it is determined whether or not the same direction is determined as the in-focus direction a predetermined number of times a' in succession. If the same direction is determined the predetermined number of times a or a', the flow proceeds to step 408, or to step 406 if not.

The following is set:

$$\text{predetermined number of times } a < \text{predetermined number of times } a' \quad (1)$$

to perform processing under difference conditions for proceeding to step 408 (that is, conditions for considering that the direction can be determined at step 408 and then deciding the transition to the climbing drive control through step 411).

The conditions set as the expression (1) can limit the transition to the climbing drive control when the amplitude center movement direction is different from the external metering in-focus direction.

Consequently, the direction determination can be made more accurately in the TV-AF method (the fine drive control) to reduce the occurrence of the climbing drive in a wrong direction.

While Embodiment 1 has been described for the case where the different conditions are used for the transition to the climbing drive control depending on the comparison result between the amplitude center direction and the external metering in-focus direction, it is possible that the transition is allowed under predetermined conditions when the amplitude center direction matches the external metering in-focus direction, and the transition is inhibited when they are different.

After step 406, it is determined at step 428 whether or not the in-focus position detected in the TV-AF method (the central position of the amplitude in the vibration drive, hereinafter referred to as an amplitude central position: first position information) lies within the depth of focus (a predetermined range) relative to the in-focus position (hereinafter referred to as the external metering in-focus position: second position information) obtained on the basis of a detection signal from the external distance measuring unit 126. If it is within the depth of focus, the flow proceeds to step 407, or to step 429 if it is out of the depth of focus.

If it is determined at step 407 that the focus lens unit 105 repeats the reciprocation in the same area a predetermined number of times b, the flow proceeds to step 409. At step 429, it is determined whether or not the focus lens unit 105 repeats the reciprocation in the same area a predetermined number of times b', and if not, the flow proceeds to step 410.

The following is set:

$$\text{predetermined number of times } b < \text{predetermined number of times } b' \quad (2)$$

to perform processing under difference conditions for proceeding to step 409 (that is, conditions for considering that focusing is achieved at step 409 and then deciding the transition to the restart determination processing via step 411).

The conditions set as the expression (2) can limit the determination that the focus lens unit 105 is located at the in-focus position (that is, the stop of the fine drive control operation and the transition to the restart determination processing) when the amplitude central position and the external metering in-focus position are not within the depth of focus.

Consequently, the in-focus state can be determined more accurately in the TV-AF method (the fine drive control) to reduce the occurrence of an erroneous stop of the focusing operation.

While Embodiment 1 has been described for the case where the different conditions are used for the determination of the in-focus state depending on the comparison result between the amplitude central position and the external metering in-focus position, it is possible that the determination is allowed under predetermined conditions when the amplitude central position matches the external metering in-focus position, and the determination is inhibited when they are different.

At step 414, if the infinite side AF evaluation value is larger than the closest side AF evaluation value, the flow proceeds to step 430. If the infinite side AF evaluation value is not larger than the closest side AF evaluation value, the flow proceeds to step 416. At step 422, if the closest side AF evaluation value is larger than the infinite side AF evaluation value, the flow proceeds to step 432. If the closest side AF evaluation value is not larger than the infinite side AF evaluation value, the flow proceeds to step 424.

At step 430 and step 432, it is determined whether or not the amplitude center movement direction, which is the direction in which the focus lens unit 105 is to move, is equal to the external metering in-focus direction, and whether or not the amplitude central position is out of the depth of focus relative to the external metering in-focus position. If not at step 430 and step 432, the flow proceeds to step 415 and to 423, respectively. In this manner, the drive amplitude is set to the amplitude (a first amplitude) as in the related art.

On the other hand, if the positive results ("yes") are returned at step 430 and 432, the flow proceeds to step 431 and step 433, respectively, where a predetermined amount is added to the central movement amplitude which is used for calculating the drive amplitude at steps 415 and 423. In this manner, the drive amplitude is set to an amplitude (a second amplitude) larger than that in the related art. In other words, the different drive amplitudes are used for processing depending on whether or not the amplitude center movement direction is equal to the external metering in-focus direction when the vibration drive of the focus lens unit 105 is performed.

The determination whether or not the amplitude central position is out of the depth of focus is made because the focus lens unit 105 need not be moved quickly with a larger central movement amplitude if it is close to the in-focus point.

In this manner, when the amplitude center movement direction is equal to the external metering in-focus direction, the vibration drive of the focus lens unit 105 is controlled to have a larger amplitude as compared with the case where they are different, which allows the focus lens unit 105 to reach the in-focus point quickly.

Figure 6:
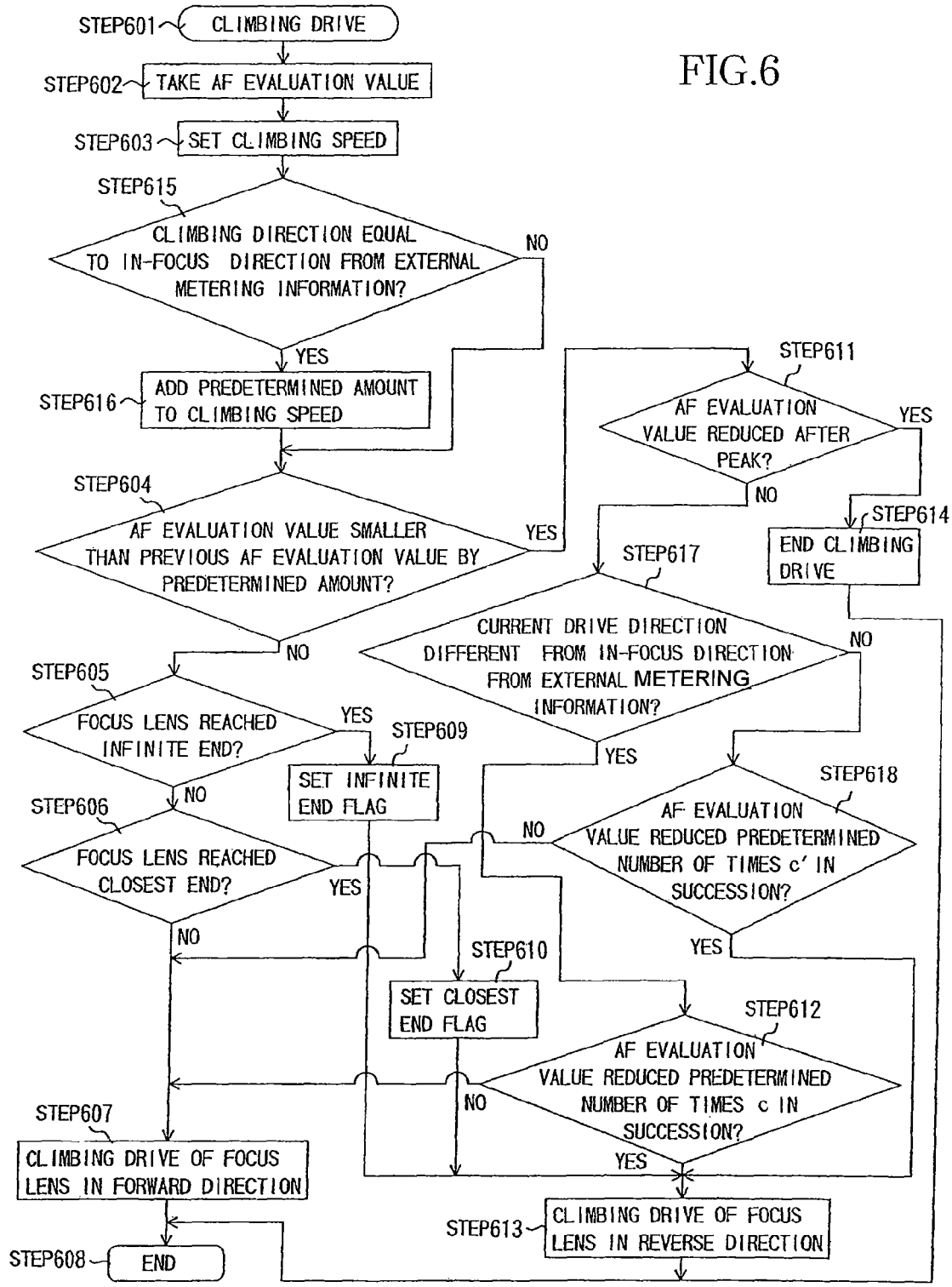
FIG. 6 is a flow chart showing climbing drive control.

Next, the climbing drive control in Embodiment 1 is described with reference to FIG. 6. The steps identical to those described in the climbing drive control of the related art described in FIG. 12 are designated with the same reference numerals in FIG. 6 and description thereof is omitted.

At step 603, the drive speed of the focus lens unit 105 in the climbing drive control is set to a predetermined value (a first drive speed). Then, at step 615, it is determined whether or not the current climbing drive direction of the focus lens unit 105 (the direction determined in the fine drive control: first direction information) matches the external metering in-focus direction. If they are not equal, the flow proceeds to step 604, or if they are equal, the flow proceeds to 616 where a predetermined amount is added to the drive speed, thereby setting a drive speed (a second drive speed) higher than the drive speed (the predetermined value) in the related art. This is because the in-focus point is likely to exist in the climbing drive direction when the direction matches the external metering in-focus direction and thus the drive at high speed can be performed to cause the focus lens unit 105 to reach the in-focus point in a short time.

At a later point, at step 607, the focus lens unit 105 is driven at either of the set drive speeds.

In this manner, processing is performed with the different drive speeds of the focus lens unit 105 in the climbing drive control depending on whether or not the climbing drive direction is equal to the external metering in-focus direction. When the two directions are equal, the higher drive speed can be set to reduce the time to achieve focusing.

If the AF evaluation value is not reduced passing through the peak at step 611, the flow proceeds to step 617, or to step 614 if the AF evaluation value is reduced passing through the peak.

At step 617, it is determined whether or not the current climbing drive direction of the focus lens unit 105 is different from the external metering in-focus direction. If they are equal, the flow proceeds to step 612, or to step 618 if not.

At step 612, it is determined whether or not the AF evaluation is reduced a predetermined number of times c in succession. If it is reduced in succession, the flow proceeds to step 613, or to step 607 if it is not reduced in succession.

On the other hand, it is determined at step 618 whether or not the AF evaluation value is reduced a predetermined number of times c' in succession. If it is reduced in succession, the flow proceeds to step 613, or to step 607 if it is not reduced in succession.

The following is set:

$$\text{predetermined number of times } c < \text{predetermined number of times } c' \quad (3)$$

to perform processing under difference conditions for proceeding to step 613 (that is, conditions for determining reversal of the drive direction of the focus lens unit 105 at step 613).

The conditions set as the expression (3) can limit the climbing drive of the focus lens unit 105 in the reversed direction different from the external metering in-focus direction. Consequently, the drive direction of the focus lens unit 105 can be reversed more accurately in the TV-AF method (the climbing drive control) to reduce the occurrence of the reversed drive in a wrong direction.

While Embodiment 1 has been described for the case where the different conditions are used for the reversal of the drive direction depending on the comparison result between the climbing drive direction and the external metering in-focus direction, it is possible that the reversal is allowed when the climbing drive direction is different from the external metering in-focus direction, and the reversal is inhibited when they are the same direction.

As described above, according to Embodiment 1, switching is performed to achieve the control in the TV-AF method with a higher probability of searching for the in-focus position depending on the comparison result between the information obtained in the TV-AF method and the information obtained in the detection signal from the external distance measuring unit 126. It is thus possible to reduce the possibility of erroneous control.

As a result, the focus lens can be quickly moved to the in-focus point. In addition, moving the focus lens in a wrong direction or stopping the focusing operation with a blurred image can be avoided as much as possible. In Embodiment 1, the focus lens unit is controlled mainly on the basis of the information obtained in the TV-AF method and the focus lens unit is not driven in an AF method other than the TV-AF method, thereby eliminating the disadvantage that the focus lens unit passes the in-focus point.

Embodiment 2

Figure 8:
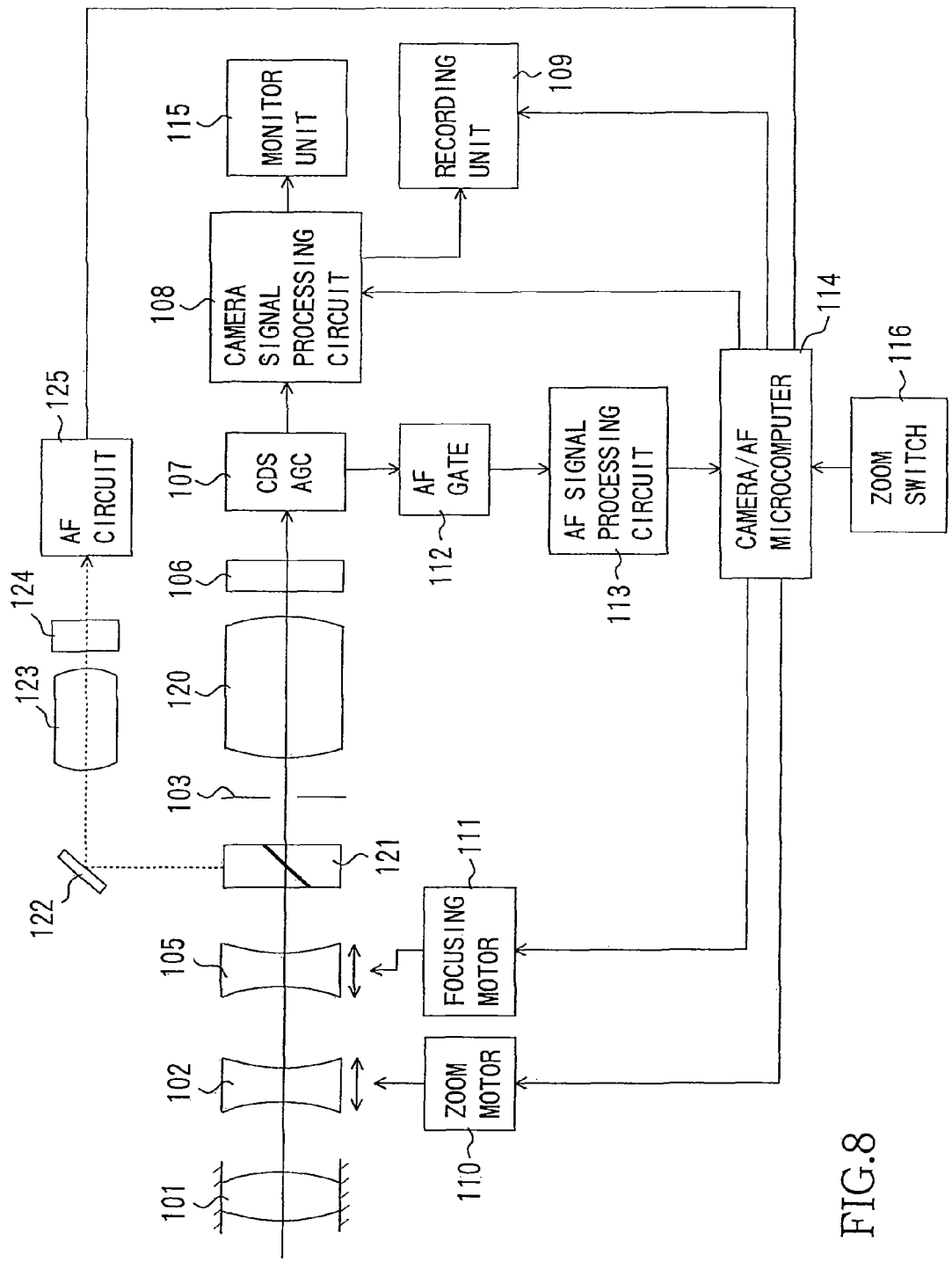
FIG. 8 is a block diagram showing the structure of a video camera which is Embodiment 2 of the present invention.

FIG. 8 is a block diagram showing the system structure of a video camera (an image-taking apparatus) which is Embodiment 2 of the present invention. In Embodiment 2, the components identical to those in Embodiment 1 described above are designated with the same reference numerals as those in Embodiment 1, and description thereof is omitted.

While Embodiment 1 has been described for the case where the external distance measuring unit 126 is used as the second detecting means, Embodiment 2 is described for the case where an AF circuit which performs TTL (Through The Lens) phase difference detection is used.

In FIG. 8, reference numeral 101 denotes a first fixed lens unit, reference numeral 102 denotes a lens unit (hereinafter referred to as a zoom lens unit) which provides variable magnification, and reference numeral 105 denotes a lens unit (hereinafter referred to as a focus lens unit) which has both of a focus adjusting function and a so-called compensator function of correcting movements of an image surface due to varied magnification. Reference numeral 120 shows an image-forming lens unit which is disposed between a stop 103 and an image-pickup element 106. It should be noted that, while each lens unit is shown in FIG. 8 as it is formed of a single lens, each lens unit may actually be formed of a single lens or a plurality of lenses.

Reference numeral 121 shows a half prism which is disposed between the focus lens unit 105 and the stop 103 and splits light for auto-focusing. Reference numeral 122 shows a submirror which reflects a luminous flux from the half prism 121, reference numeral 123 denotes an AF image-forming lens which forms a luminous flux from the submirror 121 into an image. Reference numeral 125 shows an AF circuit (a second detector) which has a line sensor (AF sensor) 124 for achieving the phase difference detection method.

A camera/AF microcomputer 114 detects a defocus amount and a defocus direction of the image-taking optical system from an output of the AF sensor 124 via the AF circuit 125.

In the video camera of such a structure, the stop 103 is operating while moving images are taken, so that the half prism 121 before the stop 103 needs to split a luminous flux incident on the image-taking optical system.

Figure 9A:
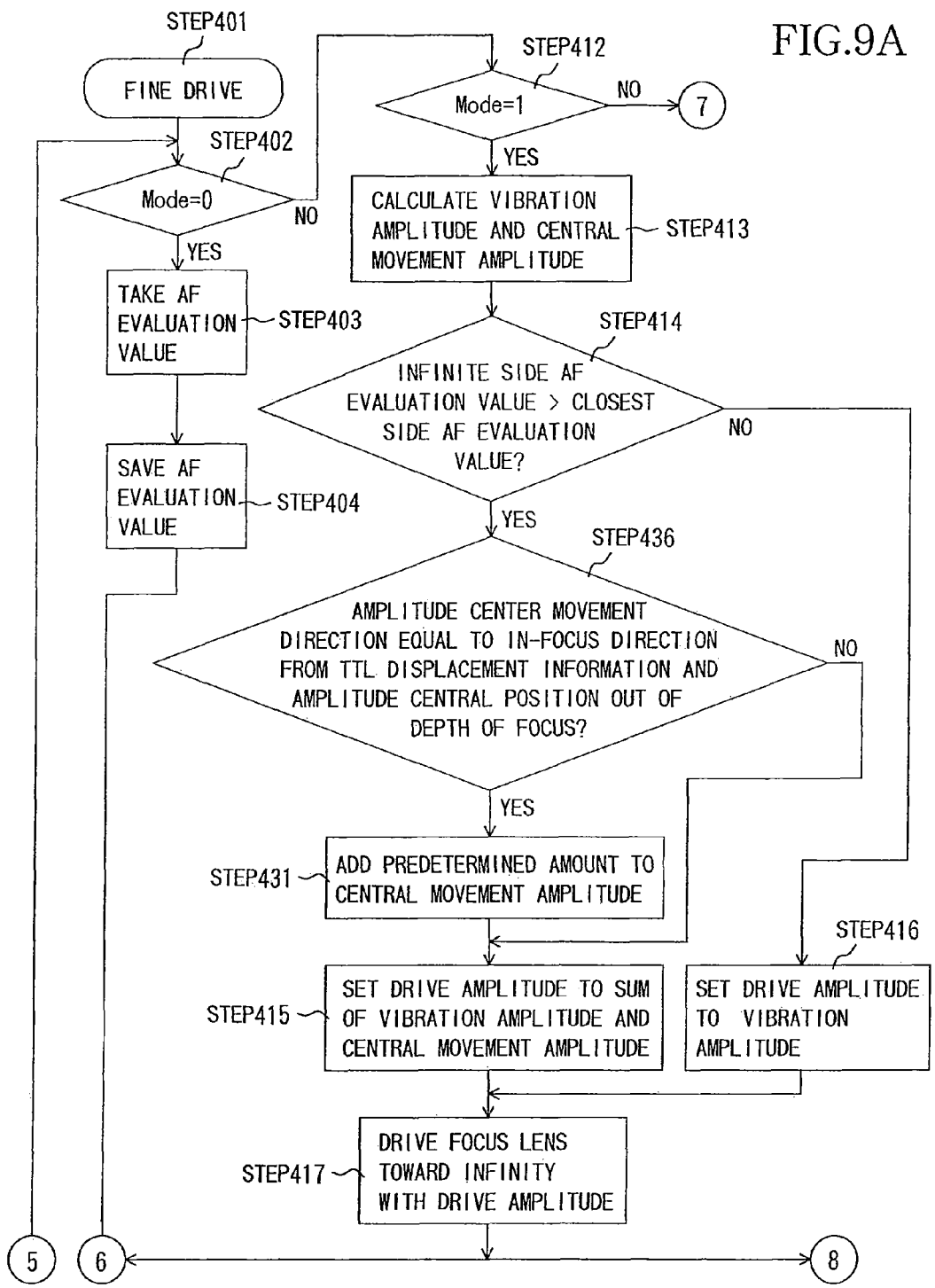
FIG. 9A is a flow chart showing fine drive control of AF control in Embodiment 2.
Figure 9B:
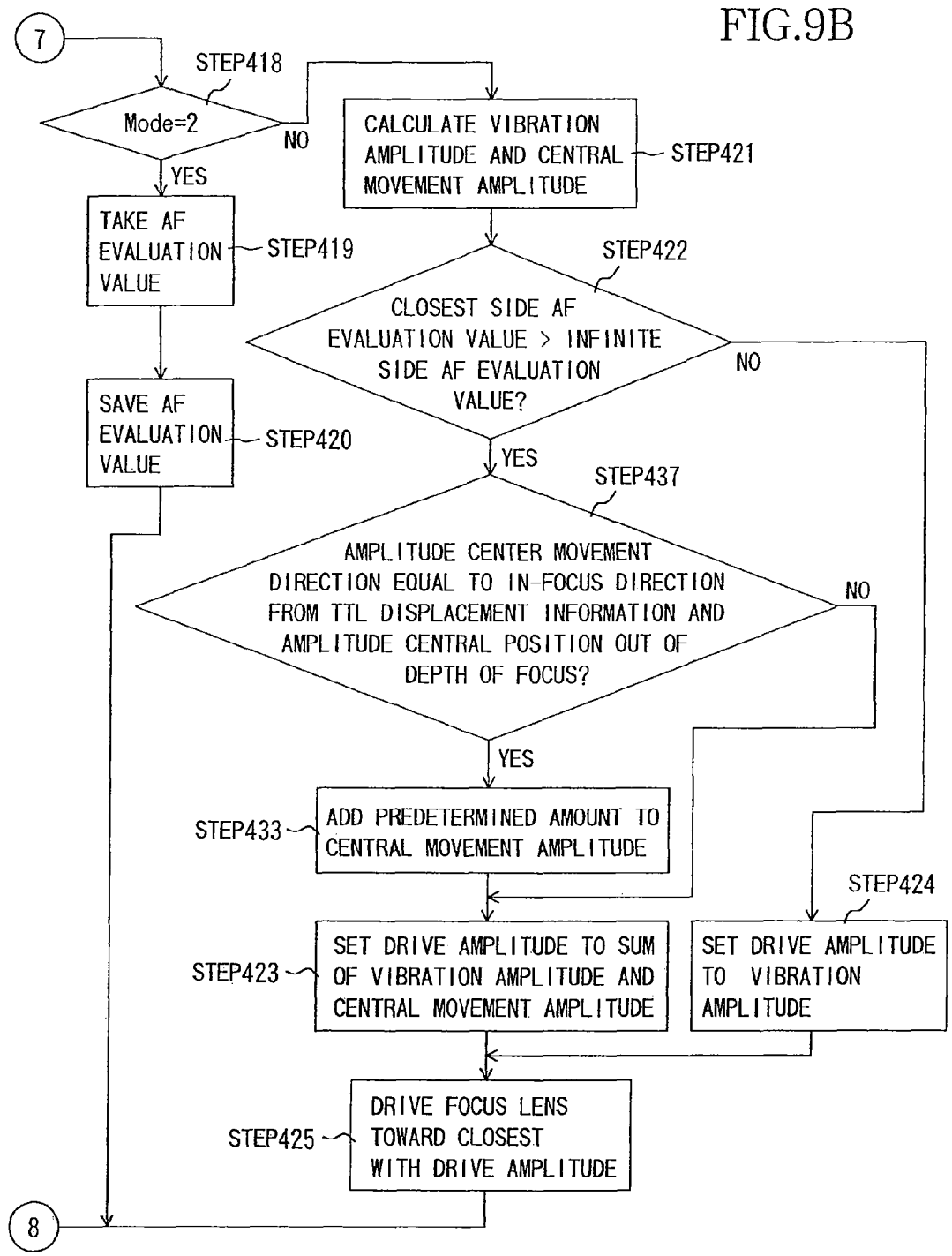
FIG. 9B is a flow chart showing the fine drive control of the AF control in Embodiment 2.
Figure 9C:
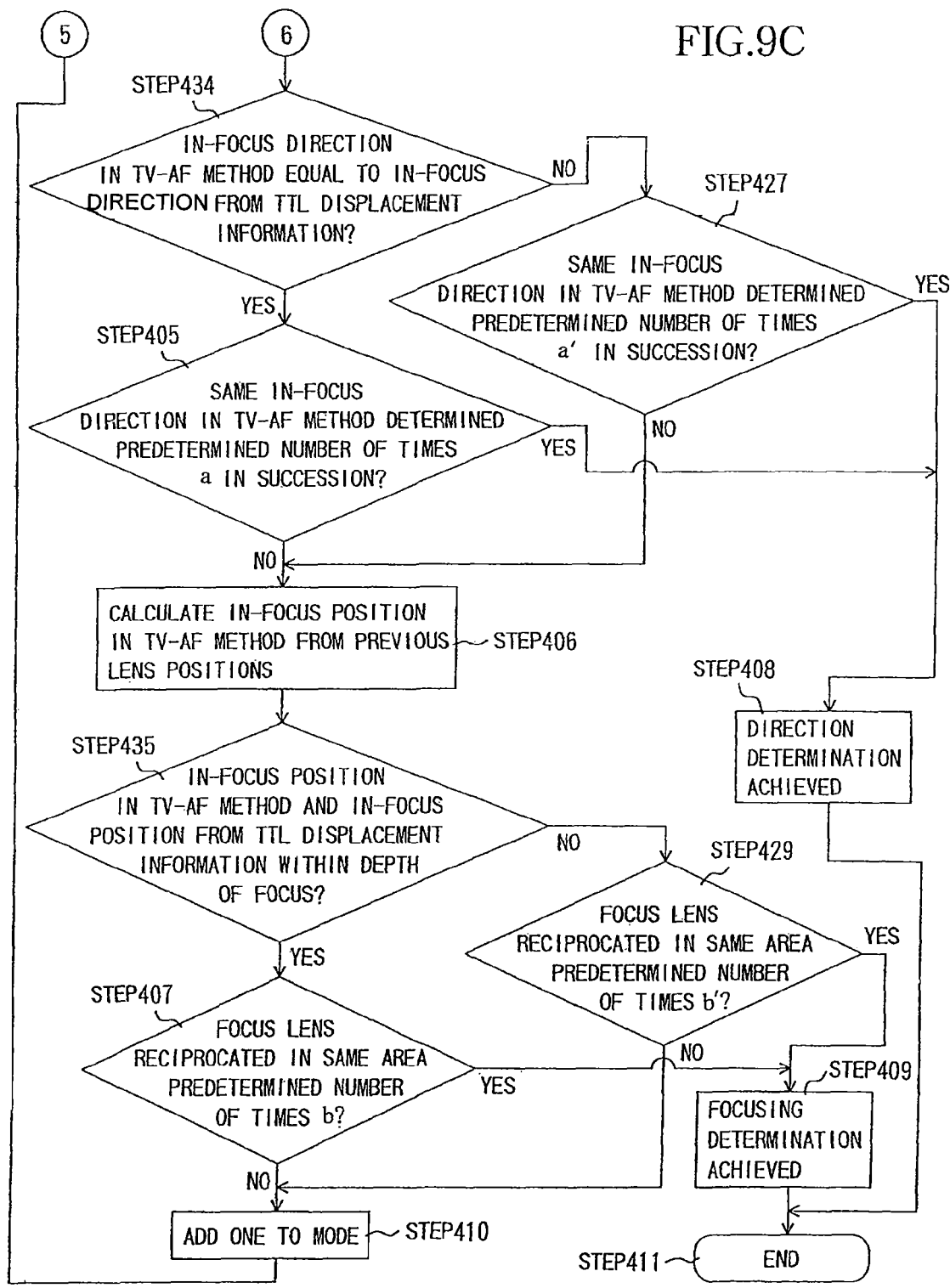
FIG. 9C is a flow chart showing the fine drive control of the AF control in Embodiment 2.
Figure 10:
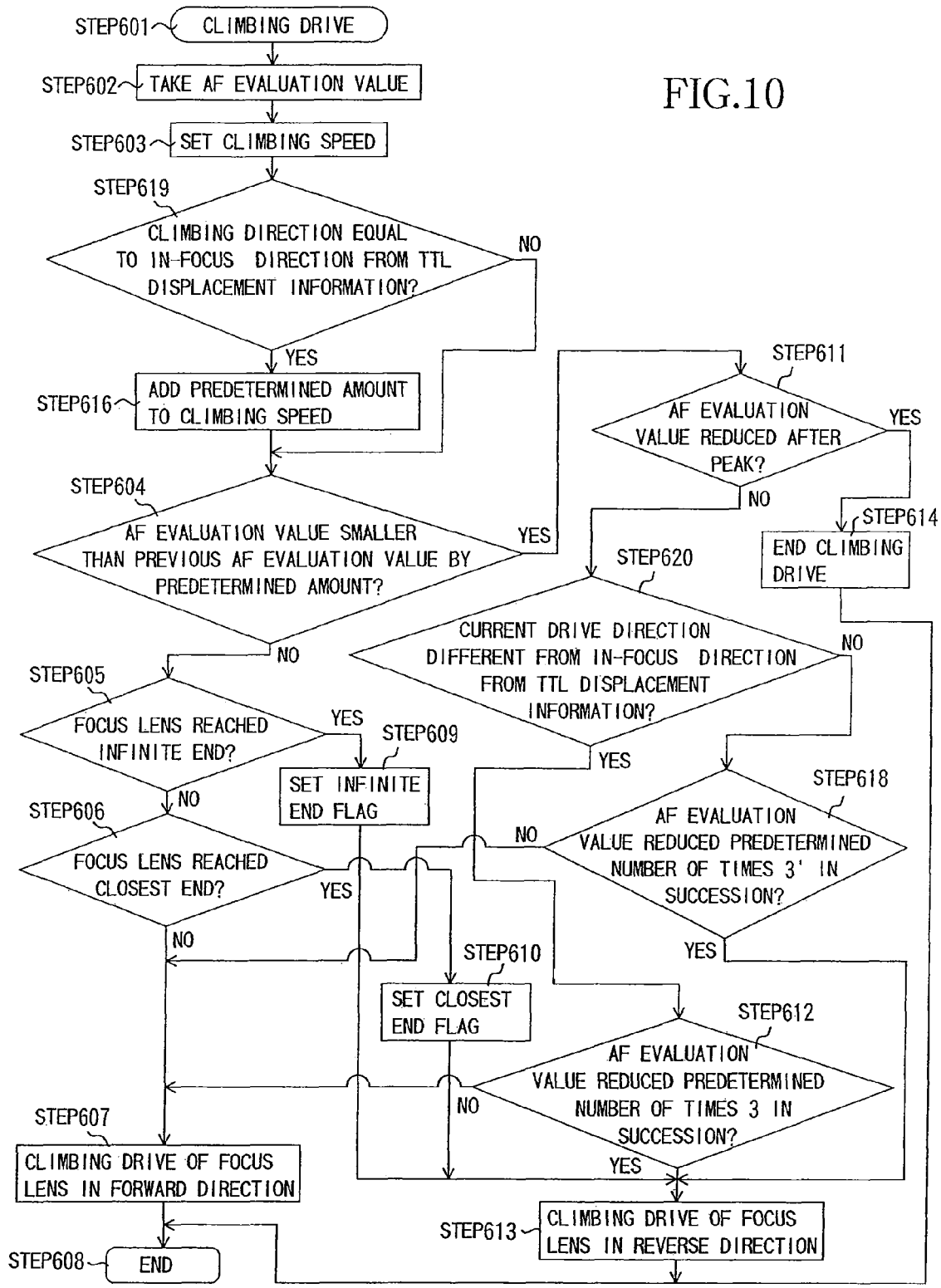
FIG. 10 is a flow chart showing climbing drive control of the AF control in Embodiment 2.

In Embodiment 2, an algorithm for AF control substantially similar to that described in Embodiment 1 can be applied. The general TV-AF control is the same as that shown in FIG. 3. FIGS. 9A to 9C and FIG. 10 show flow charts of fine drive control and climbing drive control in Embodiment 2. In FIGS. 9A to 9C, the same circled characters indicate links therebetween.

In Embodiment 2, the camera/AF microcomputer 114 takes TTL displacement information (a defocus amount and a defocus direction) based on an output from the AF circuit 125. The TTL displacement information is relied on to obtain information representing an in-focus position of the focus lens unit 105 and information representing an in-focus direction.

The information thus obtained (which is shown as TTL displacement information in FIGS. 9A to 9C and FIG. 10) is compared with an in-focus position and an in-focus direction obtained in the TV-AF method at step 434, step 435, step 436, step 437, step 619, and step 620 instead of the external metering position direction and the external metering in-focus direction described in Embodiment 1. The other steps are identical to those described with reference to FIGS. 4A to 4C and FIG. 5 in Embodiment 1.

According to Embodiment 2, similarly to Embodiment 1, switching is performed to achieve control in the TV-AF method with a high probability of searching for an in-focus position depending on the comparison result between the information obtained in the TV-AF method and the information obtained in a detection signal from the AF circuit 125 which performs phase difference detection. It is thus possible to reduce the possibility of erroneous control.

As a result, the focus lens can be quickly moved to the in-focus point. In addition, moving the focus lens in a wrong direction or stopping the focusing operation with a blurred image can be avoided as much as possible. In Embodiment 2, the focus lens unit is controlled mainly on the basis of the information obtained in the TV-AF method and the focus lens unit is not driven with an AF method other than the TV-AF method, thereby eliminating the disadvantage that the focus lens unit passes the in-focus point.

While preferred embodiments have been described, it is to be understood that modification and variation of the present invention may be made without departing from the scope of the following claims.

"This application claims priority from Japanese Patent Application No. 2003-355438 filed on Oct. 15, 2003, which is hereby incorporated by reference herein."

What is claimed is:

1. An image-taking apparatus comprising:

an image-pickup element configured to photoelectrically convert an object image formed by an image-taking optical system including a focus lens;

a first detector configured to detect information for searching for an in-focus position of the focus lens in accordance with a focus evaluation value signal, the focus evaluation value signal representing a focusing state of the image-taking optical system and being based on a predetermined frequency component of an output signal of the image-pickup element;

a second detector configured to detect information on an in-focus position of the focus lens in accordance with a detection signal, wherein the detection signal corresponds to a relative positional displacement amount of split object images; and a controller configured to perform a first control of driving the focus lens and a second control of driving the focus lens, the second control being performed by the controller when matching (a) a direction of the in-focus position obtained according to the information detected by the second detector and (b) a direction of the in-focus position obtained by the first detector during the first control, wherein, in the first control, the controller controls the focus lens in accordance with the focus evaluation value signal by regarding the in-focus position as being in a direction in which the contrast of the object image increases, and wherein, in the second control, the controller controls the focus lens in accordance with the information detected by the second detector.

2. The image-taking apparatus according to claim 1, wherein the controller is configured to perform control of vibrationally driving the focus lens with different amplitudes.

* * * * *